US012725026B2

(12) United States Patent
Ming Chang et al.

(10) Patent No.: US 12,725,026 B2
(45) Date of Patent: Sep. 1, 2026

(54) RUNTIME OPTIMIZATION OF COMPUTATIONS OF AN ARTIFICIAL NEURAL NETWORK COMPILED FOR EXECUTION ON A DEEP LEARNING ACCELERATOR

(71) Applicant: Micron Technology, Inc., Boise, ID (US)

(72) Inventors: Andre Xian Ming Chang, Seattle, WA (US); Aliasger Tayeb Zaidy, Seattle, WA (US); Marko Vitez, Trieste (IT); Eugenio Culurciello, West Lafayette, IN (US)

(73) Assignee: Micron Technology, Inc., Boise, ID (US)

( * ) Notice: Subject to any disclaimer, the term of this patent is extended or adjusted under 35 U.S.C. 154(b) by 795 days.

(21) Appl. No.: 17/092,044

(22) Filed: Nov. 6, 2020

(65) Prior Publication Data

US 2022/0147813 A1 May 12, 2022

(51) Int. Cl.
*G06N 3/08* (2023.01)
*G06F 8/41* (2018.01)
(Continued)

(52) U.S. Cl.
CPC ............. *G06N 3/08* (2013.01); *G06F 8/4441* (2013.01); *G06N 3/045* (2023.01); *G06F 7/5443* (2013.01); *G06F 17/16* (2013.01)

(58) Field of Classification Search
CPC ............ G06N 3/08; G06N 3/045; G06N 3/04; G06N 3/063; G06N 3/105; G06F 8/4441; G06F 7/5443; G06F 17/16; G06F 8/443
See application file for complete search history.

(56) References Cited

U.S. PATENT DOCUMENTS 10,732,943 B2 * 8/2020 Sun ........................... G06F 8/41
2019/0114533 A1 * 4/2019 Ng ......................... G06N 3/063
(Continued)

FOREIGN PATENT DOCUMENTS

WO 2020012196 1/2020

OTHER PUBLICATIONS

Ji, Yu, et al. "Bridge the gap between neural networks and neuromorphic hardware with a neural network compiler." Proceedings of the twenty-third international conference on architectural support for programming languages and operating systems (Year: 2018).*
(Continued)

*Primary Examiner* — Adam C Standke
(74) *Attorney, Agent, or Firm* — Greenberg Traurig

(57) ABSTRACT

Systems, devices, and methods related to a Deep Learning Accelerator and memory are described. For example, an integrated circuit device may be configured to execute instructions with matrix operands and configured with random access memory (RAM). A compiler is configured to generate instructions executable by the Deep Learning Accelerator from a description of a target artificial neural network. The instructions may call routines in a runtime library that has an embedded artificial neural network configured to predict optimized execution options available to implement the routines. The prediction is based at least in part on a pattern of data being processed in the target artificial neural network and/or a pattern of usages of the routines by the instructions.

20 Claims, 11 Drawing Sheets

(51) Int. Cl.

| | |
|---|---|
| ***G06F 17/16*** | (2006.01) |
| ***G06N 3/045*** | (2023.01) |
| *G06F 7/544* | (2006.01) |

(56) References Cited

U.S. PATENT DOCUMENTS

2019/0286972 A1* 9/2019 El Husseini ........... G06N 3/063
2020/0175350 A1 6/2020 Kursun

OTHER PUBLICATIONS

Li, M., Liu, Y., Liu, X., Sun, Q., You, X., Yang, H., . . . & Qian, D. (2020). The deep learning compiler: A comprehensive survey. IEEE Transactions on Parallel and Distributed Systems, 32(3), 708-727. (Year: 2020).*

Kao et al., ConfuciuX: Autonomous Hardware Resource Assignment for DNN Accelerators using Reinforcement Learning. arXiv preprint arXiv:2009.02010. (Sep. 4, 2020).*

Justus, Daniel, et al. "Predicting the computational cost of deep learning models." 2018 IEEE international conference on big data (Big Data). IEEE, (Year: 2018).*

Xiao, Yuanlong, et al. "Reducing FPGA compile time with separate compilation for FPGA building blocks." 2019 international conference on field-programmable technology (ICFPT). IEEE, (Year: 2019).*

International Search Report and Written Opinion, PCT/US2021/055610, mailed on Feb. 7, 2022.

Mingzhen Li, et al. "The Deep Learning Compiler: A Comprehensive Survey." arXiv:2002.03794v4, Aug. 28, 2020.

* cited by examiner

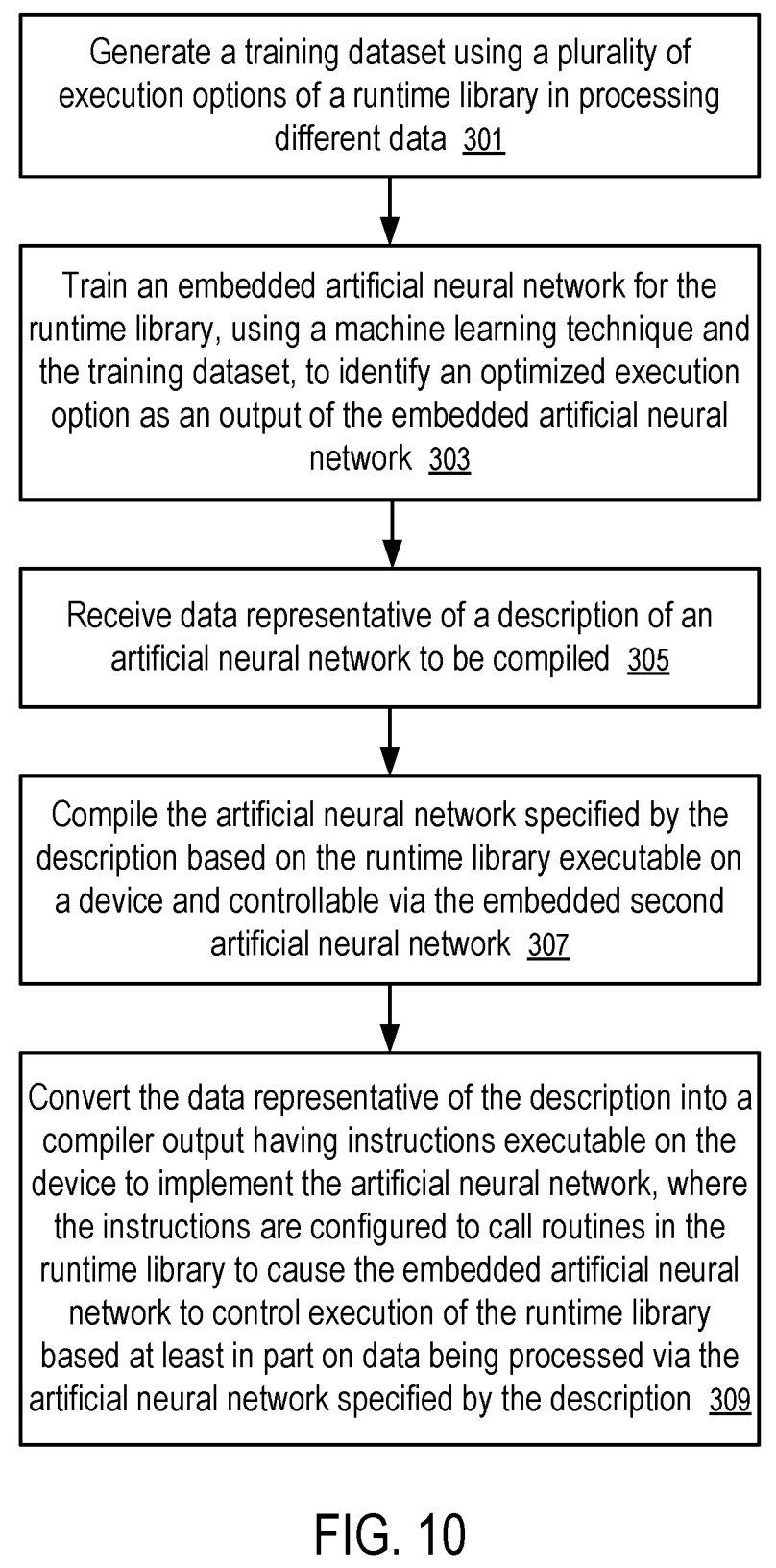

Generate a training dataset using a plurality of execution options of a runtime library in processing different data 301

Train an embedded artificial neural network for the runtime library, using a machine learning technique and the training dataset, to identify an optimized execution option as an output of the embedded artificial neural network 303

Receive data representative of a description of an artificial neural network to be compiled 305

Compile the artificial neural network specified by the description based on the runtime library executable on a device and controllable via the embedded second artificial neural network 307

Convert the data representative of the description into a compiler output having instructions executable on the device to implement the artificial neural network, where the instructions are configured to call routines in the runtime library to cause the embedded artificial neural network to control execution of the runtime library based at least in part on data being processed via the artificial neural network specified by the description 309

FIG. 10

RUNTIME OPTIMIZATION OF COMPUTATIONS OF AN ARTIFICIAL NEURAL NETWORK COMPILED FOR EXECUTION ON A DEEP LEARNING ACCELERATOR

TECHNICAL FIELD

At least some embodiments disclosed herein relate to compilers in general and more particularly, but not limited to, compiler runtime support of instructions executable by accelerators to implement an Artificial Neural Network (ANN), such as an ANN configured through machine learning and/or deep learning.

BACKGROUND

An Artificial Neural Network (ANN) uses a network of neurons to process inputs to the network and to generate outputs from the network.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

FIG. 10 shows a method of controlling execution of instructions by a Deep Learning Accelerator according to one embodiment.

DETAILED DESCRIPTION

Figure 1:
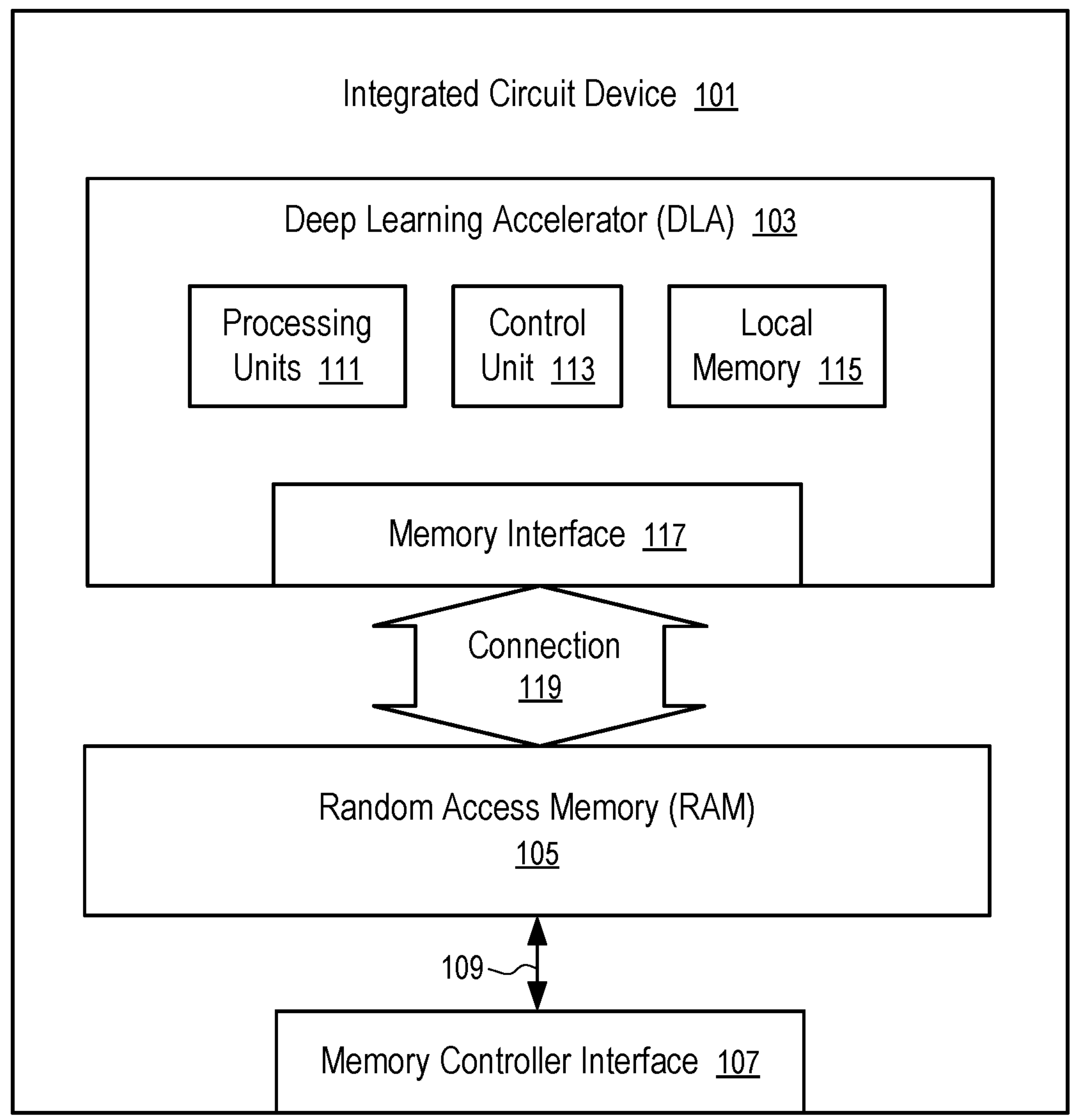
FIG. 1 shows an integrated circuit device having a Deep Learning Accelerator and random access memory configured according to one embodiment.

At least some embodiments disclosed herein provide a compiler for integrated circuits configured to implement the computation of Artificial Neural Networks (ANNs) with reduced energy consumption and computation time. Such an integrated circuit device can include a Deep Learning Accelerator (DLA) and random access memory. The compiler can convert a description of an Artificial Neural Network into a compiler output for implementing the computation of the Artificial Neural Network. The compiler output is configured to be stored in the random access memory and executed by the Deep Learning Accelerator (DLA). The compiler output can include an intelligent runtime library to support the execution of instructions generated by the compiler. The intelligent runtime library can use an embedded Artificial Neural Network to control the optimization of the executions of the compiler output in implementing the Artificial Neural Network that is specified by the description and compiled by the compiler.

For example, the Artificial Neural Network being compiled by the compiler can have different patterns of input data. The different patterns of input data can impact differently on compiler optimization. The compiler can provide an Artificial Neural Network with a runtime library that is configured to support the execution of instructions generated by the compiler. The embedded Artificial Neural Network of the runtime library can analyze the pattern of the data currently being processed by the Deep Learning Accelerator to predict the optimized execution options and dynamically adjust the compiler optimizations. Thus, compiler optimization can be performed based on not only the description of the Artificial Neural Network being compiled, but also the current data pattern being processed in the Artificial Neural Network. Different patterns of input data for the Artificial Neural Network can lead to different executions of the compiler output for improved performance.

For example, an embedded Artificial Neural Network can be configured in the runtime library of the compiler for the Deep Learning Accelerator platform. The embedded Artificial Neural Network is configured to learn and predict the optimized application of execution options in running instructions generated specific for implementing an Artificial Neural Network specified in the description to be compiled by the compiler. Optionally, the runtime library and the embedded Artificial Neural Network can be dependent on the hardware configuration and/or capability of the Deep Learning Accelerator platform. However, the runtime library and the embedded Artificial Neural Network are typically provided by the compiler in a way independent on the Artificial Neural Network to be compiled. Thus, the runtime library and the embedded Artificial Neural Network implements routine tasks common to various Artificial Neural Networks; and the specific features of a particular Artificial Neural Network being compiled are implemented in the instructions that use the runtime library. The runtime library can have different execution options to perform a predefined task. Different execution options can have different advantages in different situations that are dependent on the pattern of data being processed by a Deep Learning Accelerator.

In a training period, the runtime library can use different execution options to implement variations in execution of a compiler output. For example, the execution options can include different ways to implement a predefined computation task of Artificial Neural Networks. The execution options can include different choices of hardware options to implement the computation task on a specific Deep Learning Accelerator. Performance measurements of executing the compiler output via different execution options on the Deep Learning Accelerator for different patterns of input data can be used to train the embedded Artificial Neural Network (ANN) of the compiler to predict the optimal execution options and/or optimal choices of hardware options for the current pattern of input data.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Based on a given ANN model, a computing device can be configured to compute the output(s) of the network from a given set of inputs to the network.

For example, the inputs to an ANN network may be generated based on camera inputs; and the outputs from the ANN network may be the identification of an item, such as an event or an object.

In general, an ANN may be trained using a supervised method where the parameters in the ANN are adjusted to minimize or reduce the error between known outputs associated with or resulted from respective inputs and computed outputs generated via applying the inputs to the ANN. Examples of supervised learning/training methods include reinforcement learning and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

Deep learning uses multiple layers of machine learning to progressively extract features from input data. For example, lower layers can be configured to identify edges in an image; and higher layers can be configured to identify, based on the edges detected using the lower layers, items captured in the image, such as faces, objects, events, etc. Deep learning can be implemented via Artificial Neural Networks (ANNs), such as deep neural networks, deep belief networks, recurrent neural networks, and/or convolutional neural networks.

A typical Deep Learning Accelerator (DLA) can include a set of programmable hardware computing logic that is specialized and/or optimized to perform parallel vector and/or matrix calculations, including but not limited to multiplication and accumulation of vectors and/or matrices.

Further, the Deep Learning Accelerator can include one or more Arithmetic-Logic Units (ALUs) to perform arithmetic and bitwise operations on integer binary numbers.

The Deep Learning Accelerator is programmable via a set of instructions to perform the computations of an Artificial Neural Network (ANN).

The granularity of the Deep Learning Accelerator operating on vectors and matrices corresponds to the largest unit of vectors/matrices that can be operated upon during the execution of one instruction by the Deep Learning Accelerator. During the execution of the instruction for a predefined operation on vector/matrix operands, elements of vector/matrix operands can be operated upon by the Deep Learning Accelerator in parallel to reduce execution time and/or energy consumption associated with memory/data access. The operations on vector/matrix operands of the granularity of the Deep Learning Accelerator can be used as building blocks to implement computations on vectors/matrices of larger sizes.

The implementation of a typical/practical Artificial Neural Network involves vector/matrix operands having sizes that are larger than the operation granularity of the Deep Learning Accelerator. To implement such an Artificial Neural Network using the Deep Learning Accelerator, computations involving the vector/matrix operands of large sizes can be broken down to the computations of vector/matrix operands of the granularity of the Deep Learning Accelerator. The Deep Learning Accelerator can be programmed via instructions to carry out the computations involving large vector/matrix operands. For example, atomic computation capabilities of the Deep Learning Accelerator in manipulating vectors and matrices of the granularity of the Deep Learning Accelerator in response to instructions can be programmed to implement computations in an Artificial Neural Network.

In some implementations, the Deep Learning Accelerator lacks some of the logic operation capabilities of a typical Central Processing Unit (CPU). However, the Deep Learning Accelerator can be configured with sufficient logic units to process the input data provided to an Artificial Neural Network and generate the output of the Artificial Neural Network according to a set of instructions generated for the Deep Learning Accelerator. Thus, the Deep Learning Accelerator can perform the computation of an Artificial Neural Network with little or no help from a Central Processing Unit (CPU) or another processor. Optionally, a conventional general purpose processor can also be configured as part of the Deep Learning Accelerator to perform operations that cannot be implemented efficiently using the vector/matrix processing units of the Deep Learning Accelerator, and/or that cannot be performed by the vector/matrix processing units of the Deep Learning Accelerator.

A typical Artificial Neural Network can be described/specified in a standard format (e.g., Open Neural Network Exchange (ONNX)). A compiler can be used to convert the description of the Artificial Neural Network into a set of instructions for the Deep Learning Accelerator to perform calculations of the Artificial Neural Network. The compiler can optimize the set of instructions to improve the performance of the Deep Learning Accelerator in implementing the Artificial Neural Network.

The Deep Learning Accelerator can have local memory, such as registers, buffers and/or caches, configured to store vector/matrix operands and the results of vector/matrix operations. Intermediate results in the registers can be pipelined/shifted in the Deep Learning Accelerator as operands for subsequent vector/matrix operations to reduce time and energy consumption in accessing memory/data and thus speed up typical patterns of vector/matrix operations in implementing a typical Artificial Neural Network. The capacity of registers, buffers and/or caches in the Deep Learning Accelerator is typically insufficient to hold the entire data set for implementing the computation of a typical Artificial Neural Network. Thus, a random access memory coupled to the Deep Learning Accelerator is configured to provide an improved data storage capability for implementing a typical Artificial Neural Network. For example, the Deep Learning Accelerator loads data and instructions from the random access memory and stores results back into the random access memory.

The communication bandwidth between the Deep Learning Accelerator and the random access memory is configured to optimize or maximize the utilization of the computation power of the Deep Learning Accelerator. For example, high communication bandwidth can be provided between the Deep Learning Accelerator and the random access memory such that vector/matrix operands can be loaded from the random access memory into the Deep Learning Accelerator and results stored back into the random access memory in a time period that is approximately equal to the time for the Deep Learning Accelerator to perform the computations on the vector/matrix operands. The granularity of the Deep Learning Accelerator can be configured to increase the ratio between the amount of computations performed by the Deep Learning Accelerator and the size of the vector/matrix operands such that the data access traffic between the Deep Learning Accelerator and the random access memory can be reduced, which can reduce the requirement on the communication bandwidth between the Deep Learning Accelerator and the random access memory. Thus, the bottleneck in data/memory access can be reduced or eliminated.

FIG. 1 shows an integrated circuit device (101) having a Deep Learning Accelerator (103) and random access memory (105) configured according to one embodiment.

The Deep Learning Accelerator (103) in FIG. 1 includes processing units (111), a control unit (113), and local memory (115). When vector and matrix operands are in the local memory (115), the control unit (113) can use the processing units (111) to perform vector and matrix operations in accordance with instructions. Further, the control unit (113) can load instructions and operands from the random access memory (105) through a memory interface (117) and a high speed/bandwidth connection (119).

The integrated circuit device (101) is configured to be enclosed within an integrated circuit package with pins or contacts for a memory controller interface (107).

The memory controller interface (107) is configured to support a standard memory access protocol such that the integrated circuit device (101) appears to a typical memory controller in a way same as a conventional random access memory device having no Deep Learning Accelerator (103). For example, a memory controller external to the integrated circuit device (101) can access, using a standard memory access protocol through the memory controller interface (107), the random access memory (105) in the integrated circuit device (101).

The integrated circuit device (101) is configured with a high bandwidth connection (119) between the random access memory (105) and the Deep Learning Accelerator (103) that are enclosed within the integrated circuit device (101). The bandwidth of the connection (119) is higher than the bandwidth of the connection (109) between the random access memory (105) and the memory controller interface (107).

In one embodiment, both the memory controller interface (107) and the memory interface (117) are configured to access the random access memory (105) via a same set of buses or wires. Thus, the bandwidth to access the random access memory (105) is shared between the memory interface (117) and the memory controller interface (107). Alternatively, the memory controller interface (107) and the memory interface (117) are configured to access the random access memory (105) via separate sets of buses or wires. Optionally, the random access memory (105) can include multiple sections that can be accessed concurrently via the connection (119). For example, when the memory interface (117) is accessing a section of the random access memory (105), the memory controller interface (107) can concurrently access another section of the random access memory (105). For example, the different sections can be configured on different integrated circuit dies and/or different planes/banks of memory cells; and the different sections can be accessed in parallel to increase throughput in accessing the random access memory (105). For example, the memory controller interface (107) is configured to access one data unit of a predetermined size at a time; and the memory interface (117) is configured to access multiple data units, each of the same predetermined size, at a time.

In one embodiment, the random access memory (105) and the integrated circuit device (101) are configured on different integrated circuit dies configured within a same integrated circuit package. Further, the random access memory (105) can be configured on one or more integrated circuit dies that allows parallel access of multiple data elements concurrently.

In some implementations, the number of data elements of a vector or matrix that can be accessed in parallel over the connection (119) corresponds to the granularity of the Deep Learning Accelerator operating on vectors or matrices. For example, when the processing units (111) can operate on a number of vector/matrix elements in parallel, the connection (119) is configured to load or store the same number, or multiples of the number, of elements via the connection (119) in parallel.

Optionally, the data access speed of the connection (119) can be configured based on the processing speed of the Deep Learning Accelerator (103). For example, after an amount of data and instructions have been loaded into the local memory (115), the control unit (113) can execute an instruction to operate on the data using the processing units (111) to generate output. Within the time period of processing to generate the output, the access bandwidth of the connection (119) allows the same amount of data and instructions to be loaded into the local memory (115) for the next operation and the same amount of output to be stored back to the random access memory (105). For example, while the control unit (113) is using a portion of the local memory (115) to process data and generate output, the memory interface (117) can offload the output of a prior operation into the random access memory (105) from, and load operand data and instructions into, another portion of the local memory (115). Thus, the utilization and performance of the Deep Learning Accelerator are not restricted or reduced by the bandwidth of the connection (119).

The random access memory (105) can be used to store the model data of an Artificial Neural Network and to buffer input data for the Artificial Neural Network. The model data does not change frequently. The model data can include the output generated by a compiler for the Deep Learning Accelerator to implement the Artificial Neural Network. The model data typically includes matrices used in the description of the Artificial Neural Network and instructions generated for the Deep Learning Accelerator (103) to perform vector/matrix operations of the Artificial Neural Network based on vector/matrix operations of the granularity of the Deep Learning Accelerator (103). The instructions operate not only on the vector/matrix operations of the Artificial Neural Network, but also on the input data for the Artificial Neural Network.

In one embodiment, when the input data is loaded or updated in the random access memory (105), the control unit (113) of the Deep Learning Accelerator (103) can automatically execute the instructions for the Artificial Neural Network to generate an output of the Artificial Neural Network. The output is stored into a predefined region in the random access memory (105). The Deep Learning Accelerator (103) can execute the instructions without help from a Central Processing Unit (CPU). Thus, communications for the coordination between the Deep Learning Accelerator (103) and a processor outside of the integrated circuit device (101) (e.g., a Central Processing Unit (CPU)) can be reduced or eliminated.

Optionally, the logic circuit of the Deep Learning Accelerator (103) can be implemented via Complementary Metal Oxide Semiconductor (CMOS). For example, the technique of CMOS Under the Array (CUA) of memory cells of the random access memory (105) can be used to implement the logic circuit of the Deep Learning Accelerator (103), including the processing units q(111) and the control unit (113). Alternatively, the technique of CMOS in the Array of memory cells of the random access memory (105) can be used to implement the logic circuit of the Deep Learning Accelerator (103).

In some implementations, the Deep Learning Accelerator (103) and the random access memory (105) can be implemented on separate integrated circuit dies and connected using Through-Silicon Vias (TSV) for increased data bandwidth between the Deep Learning Accelerator (103) and the random access memory (105). For example, the Deep Learning Accelerator (103) can be formed on an integrated circuit die of a Field-Programmable Gate Array (FPGA) or Application Specific Integrated circuit (ASIC).

Alternatively, the Deep Learning Accelerator (103) and the random access memory (105) can be configured in separate integrated circuit packages and connected via multiple point-to-point connections on a printed circuit board (PCB) for parallel communications and thus increased data transfer bandwidth.

The random access memory (105) can be volatile memory or non-volatile memory, or a combination of volatile memory and non-volatile memory. Examples of non-volatile memory include flash memory, memory cells formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer that is located above the memory element columns, and wires of the other layer run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory (105). The non-volatile memory in the random access memory (105) can be used to store the model data of an Artificial Neural Network. Thus, after the integrated circuit device (101) is powered off and restarts, it is not necessary to reload the model data of the Artificial Neural Network into the integrated circuit device (101). Further, the non-volatile memory can be programmable/rewritable. Thus, the model data of the Artificial Neural Network in the integrated circuit device (101) can be updated or replaced to implement an update Artificial Neural Network, or another Artificial Neural Network.

The processing units (111) of the Deep Learning Accelerator (103) can include vector-vector units, matrix-vector units, and/or matrix-matrix units. Examples of units configured to perform for vector-vector operations, matrix-vector operations, and matrix-matrix operations are discussed below in connection with FIGS. 2-4.

Figure 2:
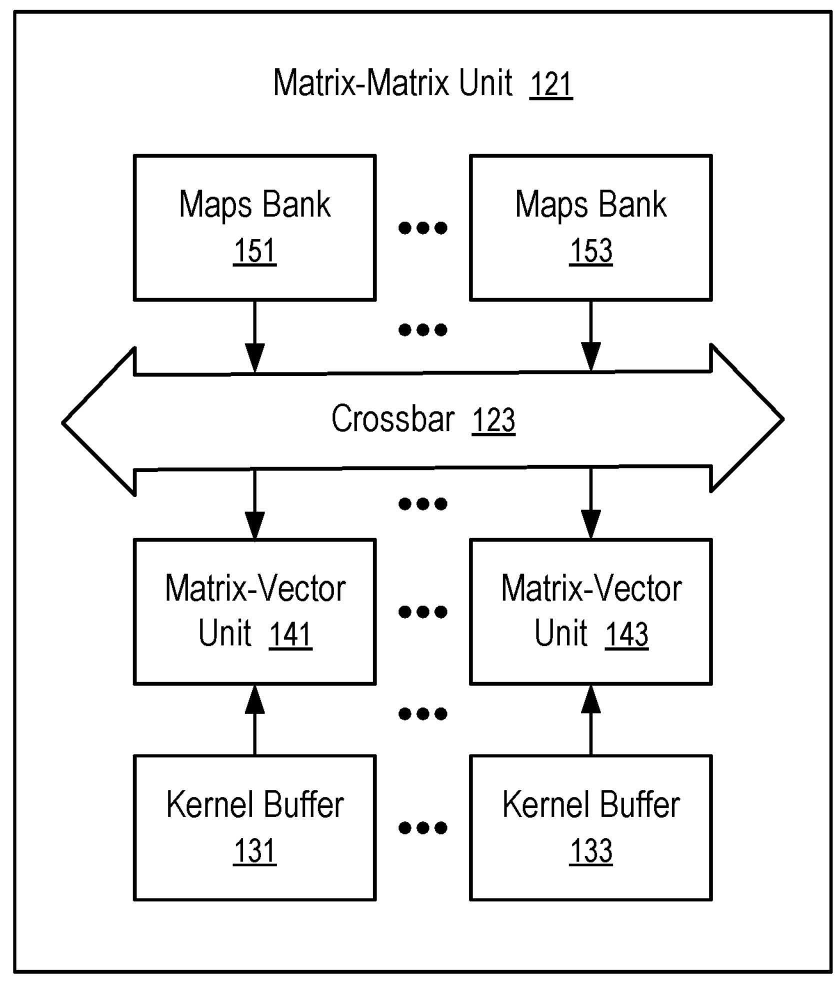
FIG. 2 shows a processing unit configured to perform matrix-matrix operations according to one embodiment.

FIG. 2 shows a processing unit configured to perform matrix-matrix operations according to one embodiment. For example, the matrix-matrix unit (121) of FIG. 2 can be used as one of the processing units (111) of the Deep Learning Accelerator (103) of FIG. 1.

In FIG. 2, the matrix-matrix unit (121) includes multiple kernel buffers (131 to 133) and multiple the maps banks (151 to 153). Each of the maps banks (151 to 153) stores one vector of a matrix operand that has multiple vectors stored in the maps banks (151 to 153) respectively; and each of the kernel buffers (131 to 133) stores one vector of another matrix operand that has multiple vectors stored in the kernel buffers (131 to 133) respectively. The matrix-matrix unit (121) is configured to perform multiplication and accumulation operations on the elements of the two matrix operands, using multiple matrix-vector units (141 to 143) that operate in parallel.

A crossbar (123) connects the maps banks (151 to 153) to the matrix-vector units (141 to 143). The same matrix operand stored in the maps bank (151 to 153) is provided via the crossbar (123) to each of the matrix-vector units (141 to 143); and the matrix-vector units (141 to 143) receives data elements from the maps banks (151 to 153) in parallel. Each of the kernel buffers (131 to 133) is connected to a respective one in the matrix-vector units (141 to 143) and provides a vector operand to the respective matrix-vector unit. The matrix-vector units (141 to 143) operate concurrently to compute the operation of the same matrix operand, stored in the maps banks (151 to 153) multiplied by the corresponding vectors stored in the kernel buffers (131 to 133). For example, the matrix-vector unit (141) performs the multiplication operation on the matrix operand stored in the maps banks (151 to 153) and the vector operand stored in the kernel buffer (131), while the matrix-vector unit (143) is concurrently performing the multiplication operation on the matrix operand stored in the maps banks (151 to 153) and the vector operand stored in the kernel buffer (133).

Figure 3:
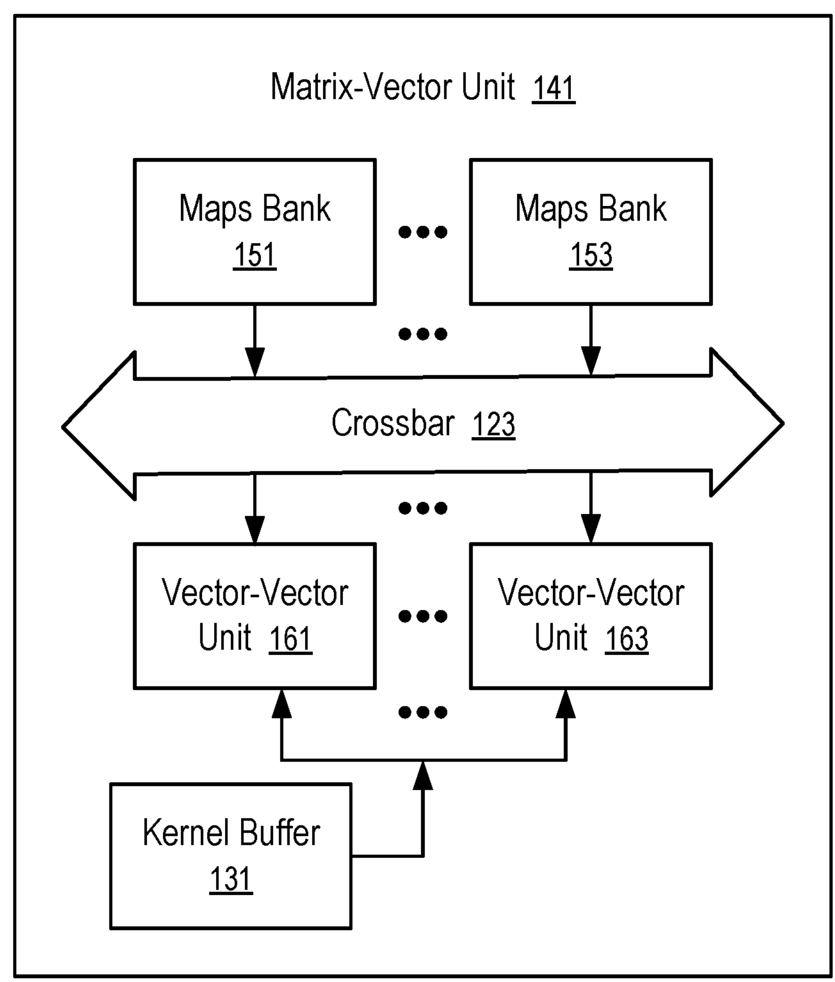
FIG. 3 shows a processing unit configured to perform matrix-vector operations according to one embodiment.

Each of the matrix-vector units (141 to 143) in FIG. 2 can be implemented in a way as illustrated in FIG. 3.

FIG. 3 shows a processing unit configured to perform matrix-vector operations according to one embodiment. For example, the matrix-vector unit (141) of FIG. 3 can be used as any of the matrix-vector units in the matrix-matrix unit (121) of FIG. 2.

In FIG. 3, each of the maps banks (151 to 153) stores one vector of a matrix operand that has multiple vectors stored in the maps banks (151 to 153) respectively, in a way similar to the maps banks (151 to 153) of FIG. 2. The crossbar (123) in FIG. 3 provides the vectors from the maps banks (151) to the vector-vector units (161 to 163) respectively. A same vector stored in the kernel buffer (131) is provided to the vector-vector units (161 to 163).

The vector-vector units (161 to 163) operate concurrently to compute the operation of the corresponding vector operands, stored in the maps banks (151 to 153) respectively, multiplied by the same vector operand that is stored in the kernel buffer (131). For example, the vector-vector unit (161) performs the multiplication operation on the vector operand stored in the maps bank (151) and the vector operand stored in the kernel buffer (131), while the vector-vector unit (163) is concurrently performing the multiplication operation on the vector operand stored in the maps bank (153) and the vector operand stored in the kernel buffer (131).

When the matrix-vector unit (141) of FIG. 3 is implemented in a matrix-matrix unit (121) of FIG. 2, the matrix-vector unit (141) can use the maps banks (151 to 153), the crossbar (123) and the kernel buffer (131) of the matrix-matrix unit (121).

Figure 4:
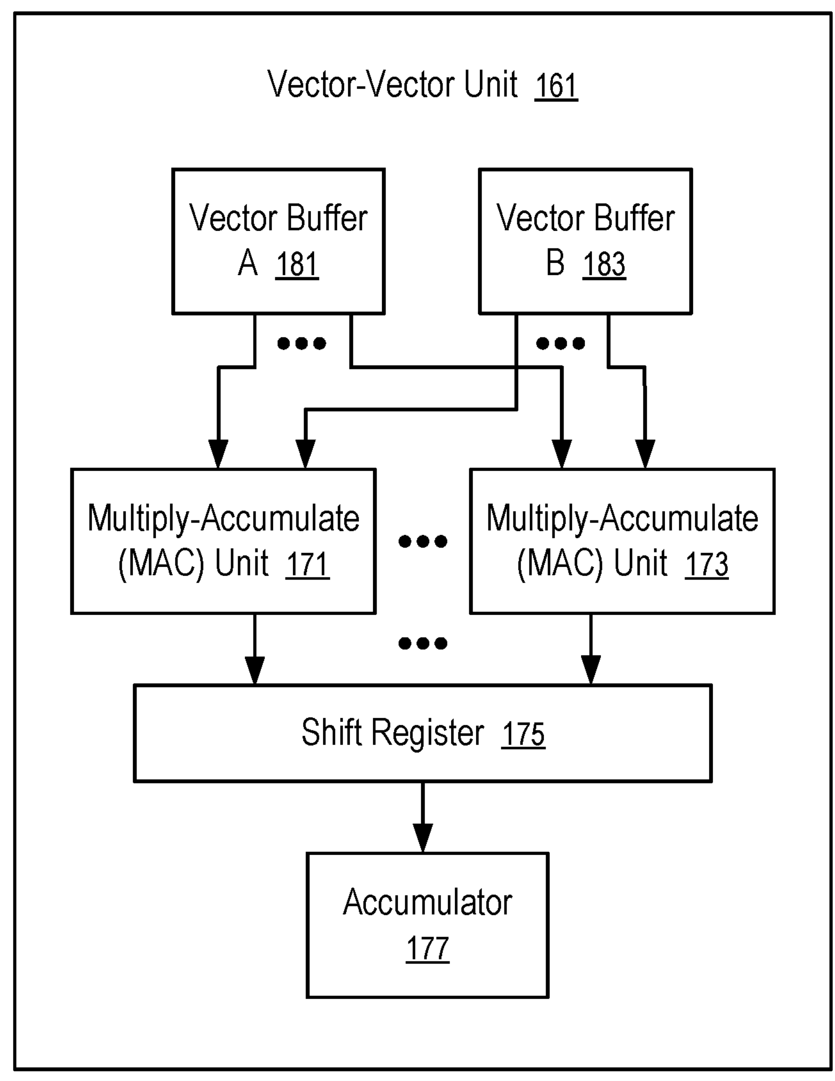
FIG. 4 shows a processing unit configured to perform vector-vector operations according to one embodiment.

Each of the vector-vector units (161 to 163) in FIG. 3 can be implemented in a way as illustrated in FIG. 4.

FIG. 4 shows a processing unit configured to perform vector-vector operations according to one embodiment. For example, the vector-vector unit (161) of FIG. 4 can be used as any of the vector-vector units in the matrix-vector unit (141) of FIG. 3.

In FIG. 4, the vector-vector unit (161) has multiple multiply-accumulate units (171 to 173). Each of the multiply-accumulate units (e.g., 173) can receive two numbers as operands, perform multiplication of the two numbers, and add the result of the multiplication to a sum maintained in the multiply-accumulate unit.

Each of the vector buffers (181 and 183) stores a list of numbers. A pair of numbers, each from one of the vector buffers (181 and 183), can be provided to each of the multiply-accumulate units (171 to 173) as input. The multiply-accumulate units (171 to 173) can receive multiple pairs of numbers from the vector buffers (181 and 183) in parallel and perform the multiply-accumulate (MAC) operations in parallel. The outputs from the multiply-accumulate units (171 to 173) are stored into the shift register (175); and an accumulator (177) computes the sum of the results in the shift register (175).

When the vector-vector unit (161) of FIG. 4 is implemented in a matrix-vector unit (141) of FIG. 3, the vector-vector unit (161) can use a maps bank (e.g., 151 or 153) as one vector buffer (181), and the kernel buffer (131) of the matrix-vector unit (141) as another vector buffer (183).

The vector buffers (181 and 183) can have a same length to store the same number/count of data elements. The length can be equal to, or the multiple of, the count of multiply-accumulate units (171 to 173) in the vector-vector unit (161). When the length of the vector buffers (181 and 183) is the multiple of the count of multiply-accumulate units (171 to 173), a number of pairs of inputs, equal to the count of the multiply-accumulate units (171 to 173), can be provided from the vector buffers (181 and 183) as inputs to the multiply-accumulate units (171 to 173) in each iteration; and the vector buffers (181 and 183) feed their elements into the multiply-accumulate units (171 to 173) through multiple iterations.

In one embodiment, the communication bandwidth of the connection (119) between the Deep Learning Accelerator (103) and the random access memory (105) is sufficient for the matrix-matrix unit (121) to use portions of the random access memory (105) as the maps banks (151 to 153) and the kernel buffers (131 to 133).

In another embodiment, the maps banks (151 to 153) and the kernel buffers (131 to 133) are implemented in a portion of the local memory (115) of the Deep Learning Accelerator (103). The communication bandwidth of the connection (119) between the Deep Learning Accelerator (103) and the random access memory (105) is sufficient to load, into another portion of the local memory (115), matrix operands of the next operation cycle of the matrix-matrix unit (121), while the matrix-matrix unit (121) is performing the computation in the current operation cycle using the maps banks (151 to 153) and the kernel buffers (131 to 133) implemented in a different portion of the local memory (115) of the Deep Learning Accelerator (103).

Figure 5:
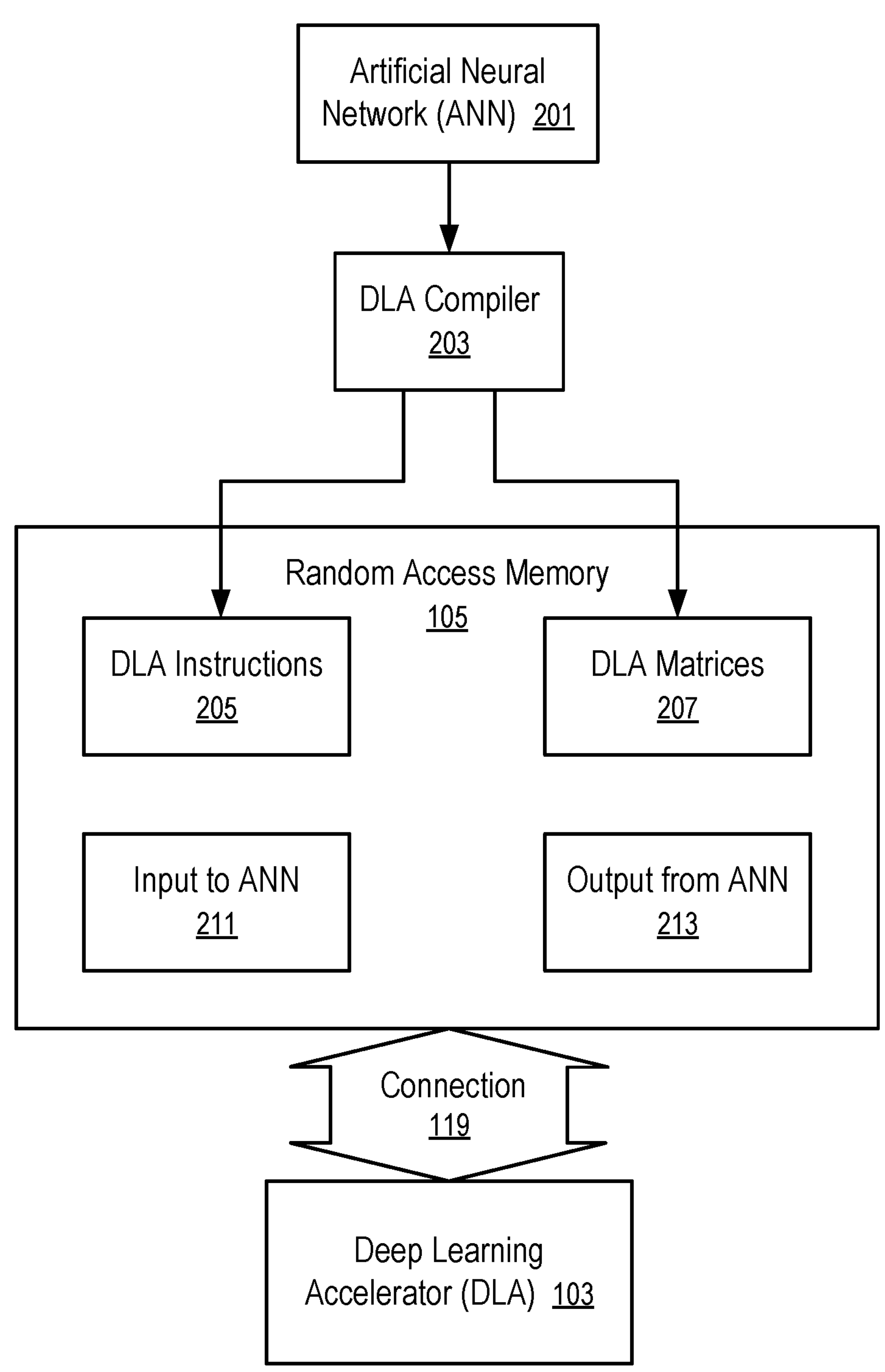
FIG. 5 shows a Deep Learning Accelerator and random access memory configured to autonomously apply inputs to a trained Artificial Neural Network according to one embodiment.

FIG. 5 shows a Deep Learning Accelerator and random access memory configured to autonomously apply inputs to a trained Artificial Neural Network according to one embodiment.

An Artificial Neural Network (201) that has been trained through machine learning (e.g., deep learning) can be described in a standard format (e.g., Open Neural Network Exchange (ONNX)). The description of the trained Artificial Neural Network (201) in the standard format identifies the properties of the artificial neurons and their connectivity.

In FIG. 5, a Deep Learning Accelerator compiler (203) converts trained Artificial Neural Network (201) by generating instructions (205) for a Deep Learning Accelerator (103) and matrices (207) corresponding to the properties of the artificial neurons and their connectivity. The instructions (205) and the matrices (207) generated by the DLA compiler (203) from the trained Artificial Neural Network (201) can be stored in random access memory (105) for the Deep Learning Accelerator (103).

For example, the random access memory (105) and the Deep Learning Accelerator (103) can be connected via a high bandwidth connection (119) in a way as in the integrated circuit device (101) of FIG. 1. The autonomous computation of FIG. 5 based on the instructions (205) and the matrices (207) can be implemented in the integrated circuit device (101) of FIG. 1. Alternatively, the random access memory (105) and the Deep Learning Accelerator (103) can be configured on a printed circuit board with multiple point to point serial buses running in parallel to implement the connection (119).

In FIG. 5, after the results of the DLA compiler (203) are stored in the random access memory (105), the application of the trained Artificial Neural Network (201) to process an input (211) to the trained Artificial Neural Network (201) to generate the corresponding output (213) of the trained Artificial Neural Network (201) can be triggered by the presence of the input (211) in the random access memory (105), or another indication provided in the random access memory (105).

In response, the Deep Learning Accelerator (103) executes the instructions (205) to combine the input (211) and the matrices (207). The matrices (207) can include kernel matrices to be loaded into kernel buffers (131 to 133) and maps matrices to be loaded into maps banks (151 to 153). The execution of the instructions (205) can include the generation of maps matrices for the maps banks (151 to 153) of one or more matrix-matrix units (e.g., 121) of the Deep Learning Accelerator (103).

In some embodiments, the inputs to Artificial Neural Network (201) is in the form of an initial maps matrix.

Portions of the initial maps matrix can be retrieved from the random access memory (105) as the matrix operand stored in the maps banks (151 to 153) of a matrix-matrix unit (121). Alternatively, the DLA instructions (205) also include instructions for the Deep Learning Accelerator (103) to generate the initial maps matrix from the input (211).

According to the DLA instructions (205), the Deep Learning Accelerator (103) loads matrix operands into the kernel buffers (131 to 133) and maps banks (151 to 153) of its matrix-matrix unit (121). The matrix-matrix unit (121) performs the matrix computation on the matrix operands. For example, the DLA instructions (205) break down matrix computations of the trained Artificial Neural Network (201) according to the computation granularity of the Deep Learning Accelerator (103) (e.g., the sizes/dimensions of matrices that loaded as matrix operands in the matrix-matrix unit (121)) and applies the input feature maps to the kernel of a layer of artificial neurons to generate output as the input for the next layer of artificial neurons.

Upon completion of the computation of the trained Artificial Neural Network (201) performed according to the instructions (205), the Deep Learning Accelerator (103) stores the output (213) of the Artificial Neural Network (201) at a pre-defined location in the random access memory (105), or at a location specified in an indication provided in the random access memory (105) to trigger the computation.

When the technique of FIG. 5 is implemented in the integrated circuit device (101) of FIG. 1, an external device connected to the memory controller interface (107) can write the input (211) into the random access memory (105) and trigger the autonomous computation of applying the input (211) to the trained Artificial Neural Network (201) by the Deep Learning Accelerator (103). After a period of time, the output (213) is available in the random access memory (105); and the external device can read the output (213) via the memory controller interface (107) of the integrated circuit device (101).

For example, a predefined location in the random access memory (105) can be configured to store an indication to trigger the autonomous execution of the instructions (205) by the Deep Learning Accelerator (103). The indication can optionally include a location of the input (211) within the random access memory (105). Thus, during the autonomous execution of the instructions (205) to process the input (211), the external device can retrieve the output generated during a previous run of the instructions (205), and/or store another set of input for the next run of the instructions (205).

Optionally, a further predefined location in the random access memory (105) can be configured to store an indication of the progress status of the current run of the instructions (205). Further, the indication can include a prediction of the completion time of the current run of the instructions (205) (e.g., estimated based on a prior run of the instructions (205)). Thus, the external device can check the completion status at a suitable time window to retrieve the output (213).

In some embodiments, the random access memory (105) is configured with sufficient capacity to store multiple sets of inputs (e.g., 211) and outputs (e.g., 213). Each set can be configured in a predetermined slot/area in the random access memory (105).

The Deep Learning Accelerator (103) can execute the instructions (205) autonomously to generate the output (213) from the input (211) according to matrices (207) stored in the random access memory (105) without helps from a processor or device that is located outside of the integrated circuit device (101).

In a method according to one embodiment, random access memory (105) of a computing device (e.g., integrated circuit device (101)) can be accessed using an interface (107) of the computing device to a memory controller. The computing device can have processing units (e.g., 111) configured to perform at least computations on matrix operands, such as a matrix operand stored in maps banks (151 to 153) and a matrix operand stored in kernel buffers (131 to 133).

For example, the computing device, implemented using the integrated circuit device (101) and/or other components, can be enclosed within an integrated circuit package; and a set of connections can connect the interface (107) to the memory controller that is located outside of the integrated circuit package.

Instructions (205) executable by the processing units (e.g., 111) can be written into the random access memory (105) through the interface (107).

Matrices (207) of an Artificial Neural Network (201) can be written into the random access memory (105) through the interface (107). The matrices (207) identify the parameters, the property and/or the state of the Artificial Neural Network (201).

Optionally, at least a portion of the random access memory (105) is non-volatile and configured to store the instructions (205) and the matrices (07) of the Artificial Neural Network (201).

First input (211) to the Artificial Neural Network can be written into the random access memory (105) through the interface (107).

An indication is provided in the random access memory (105) to cause the processing units (111) to start execution of the instructions (205). In response to the indication, the processing units (111) execute the instructions to combine the first input (211) with the matrices (207) of the Artificial Neural Network (201) to generate first output (213) from the Artificial Neural Network (201) and store the first output (213) in the random access memory (105).

For example, the indication can be an address of the first input (211) in the random access memory (105); and the indication can be stored a predetermined location in the random access memory (105) to cause the initiation of the execution of the instructions (205) for the input (211) identified by the address. Optionally, the indication can also include an address for storing the output (213).

The first output (213) can be read, through the interface (107), from the random access memory (105).

For example, the computing device (e.g., integrated circuit device (101)) can have a Deep Learning Accelerator (103) formed on a first integrated circuit die and the random access memory (105) formed on one or more second integrated circuit dies. The connection (119) between the first integrated circuit die and the one or more second integrated circuit dies can include Through-Silicon Vias (TSVs) to provide high bandwidth for memory access.

For example, a description of the Artificial Neural Network (201) can be converted using a compiler (203) into the instructions (205) and the matrices (207). The combination of the instructions (205) and the matrices (207) stored in the random access memory (105) and the Deep Learning Accelerator (103) provides an autonomous implementation of the Artificial Neural Network (201) that can automatically convert input (211) to the Artificial Neural Network (201) to its output (213).

For example, during a time period in which the Deep Learning Accelerator (103) executes the instructions (205) to generate the first output (213) from the first input (211) according to the matrices (207) of the Artificial Neural Network (201), the second input to Artificial Neural Network (201) can be written into the random access memory (105) through the interface (107) at an alternative location. After the first output (213) is stored in the random access memory (105), an indication can be provided in the random access memory to cause the Deep Learning Accelerator (103) to again start the execution of the instructions and generate second output from the second input.

During the time period in which the Deep Learning Accelerator (103) executes the instructions (205) to generate the second output from the second input according to the matrices (207) of the Artificial Neural Network (201), the first output (213) can be read from the random access memory (105) through the interface (107); and a further input can be written into the random access memory to replace the first input (211), or written at a different location. The process can be repeated for a sequence of inputs.

The Deep Learning Accelerator (103) can include at least one matrix-matrix unit (121) that can execute an instruction on two matrix operands. The two matrix operands can be a first matrix and a second matrix. Each of two matrices has a plurality of vectors. The matrix-matrix unit (121) can include a plurality of matrix-vector units (141 to 143) configured to operate in parallel. Each of the matrix-vector units (141 to 143) are configured to operate, in parallel with other matrix-vector units, on the first matrix and one vector from second matrix. Further, each of the matrix-vector units (141 to 143) can have a plurality of vector-vector units (161 to 163) configured to operate in parallel. Each of the vector-vector units (161 to 163) is configured to operate, in parallel with other vector-vector units, on a vector from the first matrix and a common vector operand of the corresponding matrix-vector unit. Further, each of the vector-vector units (161 to 163) can have a plurality of multiply-accumulate units (171 to 173) configured to operate in parallel.

The Deep Learning Accelerator (103) can have local memory (115) and a control unit (113) in addition to the processing units (111). The control unit (113) can load instructions (205) and matrix operands (e.g., some of the matrices (207)) from the random access memory (105) for execution by the processing units (111). The local memory can cache matrix operands used by the matrix-matrix unit. The connection (119) can be configured with a bandwidth sufficient to load a set of matrix operands from the random access memory (105) to the local memory (115) during a time period in which the matrix-matrix unit performs operations on two other matrix operands. Further, during the time period, the bandwidth is sufficient to store a result, generated by the matrix-matrix unit (121) in a prior instruction execution, from the local memory (115) to the random access memory (105).

At least some embodiments disclosed herein provide a compiler runtime library that has an embedded Artificial Neural Network configured to predict optimized execution options for supporting instructions generated according to a description of an Artificial Neural Network. During the execution of the instructions, routines in the runtime library can be used to perform predefined tasks. The routines and/or the implementations of the predefined tasks can have different execution options that are controllable by the embedded Artificial Neural Network of the runtime library. The embedded Artificial Neural Network can analyze, determine, and/or recognize the pattern of the data being processed via the instructions generated according to the description of the Artificial Neural Network. Based on the pattern, the embedded Artificial Neural Network predicts or selects optimized execution options to improve the performance of the Deep Learning Accelerator in implementing the computation of the Artificial Neural Network specified by the description.

Optionally, optimized execution options can be dependent on the characteristics of the hardware platform of the Deep Learning Accelerator. For example, different hardware platforms of Deep Learning Accelerators offer different hardware capabilities in matrix computations. For example, a hardware platform of Deep Learning Accelerators can offer multiple hardware options. Different hardware options and/or hardware platforms can offer different tradeoffs in capabilities and computation performances. In some instances, the optimized use of the hardware options can be dependent on the pattern of data being processed. The embedded Artificial Neural Network can be used to determine the runtime data pattern to select optimized hardware options in implementing tasks defined for the runtime library.

Some Deep Learning Accelerators can be implemented using Field-Programmable Gate Array (FPGA) or Application Specific Integrated circuit (ASIC). Different implementations can offer different options and/or features.

For example, different hardware implementations of Deep Learning Accelerators can have different numbers of parallel processing units operable to perform concurrently matrix operations of a predetermined type.

For example, different hardware implementations of Deep Learning Accelerators can have different matrix computation granularity levels. An instruction can be used to perform a predefined matrix operation on matrix operands. However, the dimensional sizes of the matrix operands of the instruction can vary from one Deep Learning Accelerator to another.

For example, different hardware implementations of Deep Learning Accelerators can have different performance ratios in a same set of hardware capabilities in matrix computation and/or memory access.

In one embodiment, the embedded artificial neural network of a runtime library of a specific platform can optimize execution options to best utilize the hardware features, capabilities, and/or options, in view of the runtime data pattern. The embedded artificial neural network can be trained in the device having the runtime library, or in a server computer.

For example, after different execution options have been used, the performance of the computation executed using the options can be measured and associated with the data patterns encountered in the computation as a training dataset. The training dataset can be used to train the embedded artificial neural network using a machine learning technique. The training can be performed using the Deep Learning Accelerator during a time period the Deep Learning Accelerator is not used to process other tasks. Alternatively, the training dataset can be communicated to another computing device, such as a remote server, to train and/or update the artificial neural network to be embedded in the runtime library. The server computer can collect multiple training dataset from different Deep Learning Accelerators to train the embedded artificial neural network to recognize various different data patterns. The trained artificial neural network can be downloaded to update the runtime library used in the Deep Learning Accelerators to improve their performance in implement their respective Artificial Neural Networks.

Figure 6:
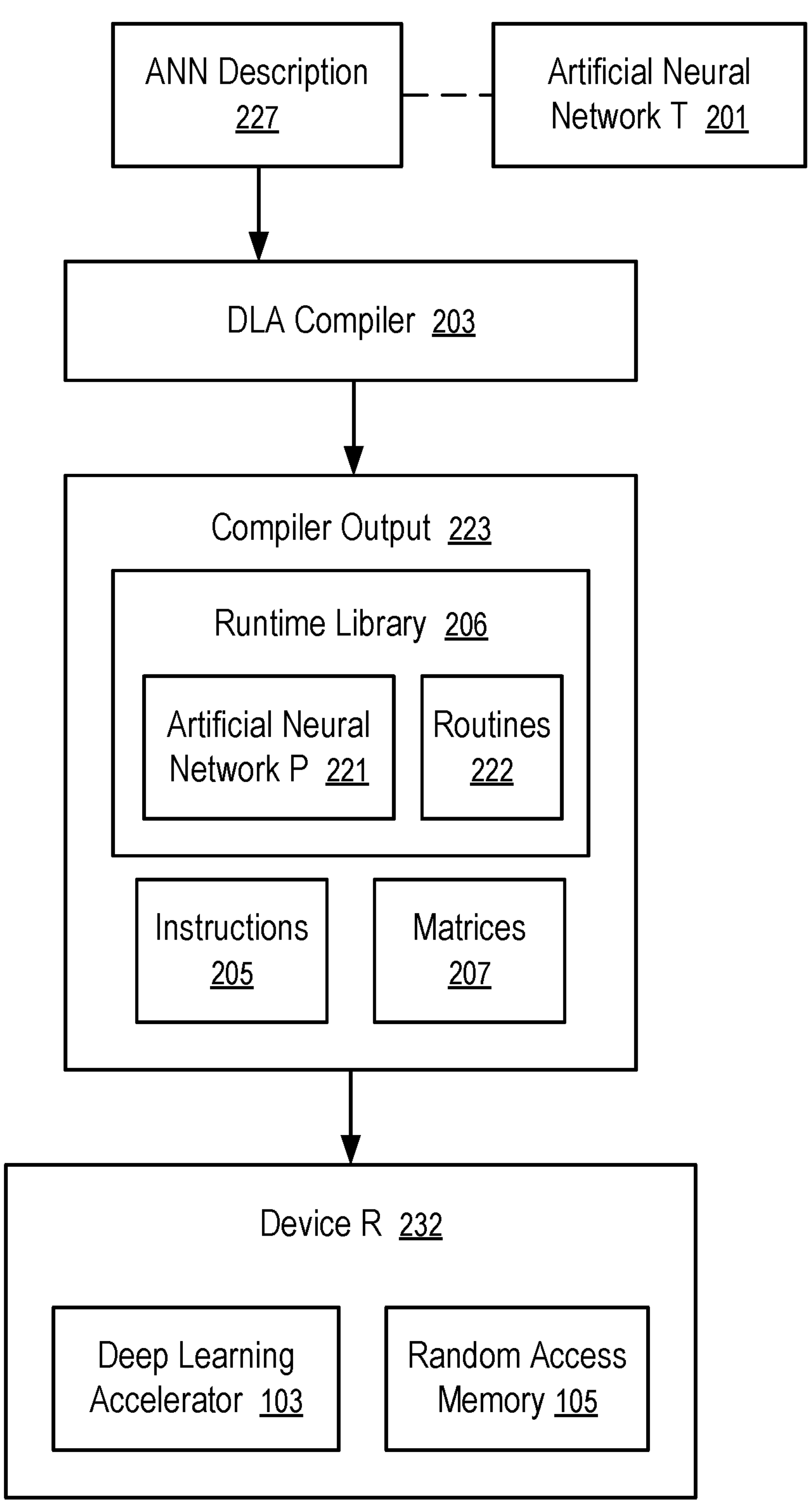
FIG. 6 shows a compiler with a runtime library having an embedded Artificial Neural Network for optimizing instruction execution on a Deep Learning Accelerator according to one embodiment.

FIG. 6 shows a compiler with a runtime library having an embedded Artificial Neural Network for optimizing instruction execution on a Deep Learning Accelerator according to one embodiment.

In FIG. 6, a runtime library (206) has an Artificial Neural Network P (221) configured to make predictions of optimized execution options in running the instructions (205) compiled by a compiler (203) from a description (227) of an Artificial Neural Network T (201).

The Artificial Neural Network T (201) is a target Artificial Neural Network to be compiled and implemented in the device R (232). To implement the target Artificial Neural Network T (201), the compiler (203) converts its description (227) into instructions (205) executable in the device R (232). The instructions (205) can use routines (222) provided in the runtime library (206) to implement the computation of the target Artificial Neural Network T (201).

The routines (222) in the runtime library (206) are not specific to the target Artificial Neural Network T (201). For example, predefined computing tasks that may be used in implementing various different Artificial Neural Networks on the hardware platform of the device R (232) and other similar devices can be programmed in the runtime library (206). Thus, the compilation according to the description (227) of a specific Artificial Neural Network T (201) does not change the runtime library (206). When another target Artificial Neural Network is compiled for the device R (232), another set of instructions can be used with the same runtime library (206) for execution by the Deep Learning Accelerator (103) of the device R (232).

The description (227) of the Artificial Neural Network T (201) identifies the parameters of the Artificial Neural Network T (201), such as the identifications of the behavior models of artificial neurons in the network and the connectivity of the artificial neurons in the network. For example, the behavior models of the artificial neurons can include the activation functions of the artificial neurons, the biases of the artificial neurons, and/or the states of the artificial neurons. For example, the description (227) can include synaptic weights for connections among the artificial neurons. The description (227) can be provided in a standard format (e.g., Open Neural Network Exchange (ONNX)) to the DLA compiler (203).

The description (227) is converted by the compiler (203) into the instructions (205) and matrices (207) in the compiler output (223). The execution of the instructions (205) can lead to the execution of the routines (222) in the runtime library (206).

The runtime library (206) can include an embedded Artificial Neural Network P (221) configured to control the execution options of the routines (222).

In general, the Artificial Neural Network P (221) of the runtime library (206) can also be specified via a description in a way similar to the specification of the Artificial Neural Network T (201). Further, the compiler (203) can compile the description of the embedded Artificial Neural Network P (221) to generate instructions and matrices similar to the instructions (205) and matrices (207) generated for the Artificial Neural Network T (201). The instructions of the embedded Artificial Neural Network P (221) can use some of the routines (222) of the runtime library (206); and some of the routines (222) can be configured to cause the execution of instructions of the embedded Artificial Neural Network P (221) to generate an output that identifies optimized execution options.

The embedded Artificial Neural Network P (221) configured in the runtime library (206) can be used, during the execution of the instructions (205) of the Artificial Neural Network T (221), to analyze and/or identify the characteristics or features of the data in the target Artificial Neural Network T (201) and predict optimize execution options for the hardware characteristics and/or options of a computing device R (232).

Preferably, the embedded Artificial Neural Network P (221) is configured to analyze the data visible to and/or operated upon by the routines (222) of the runtime library (206). Thus, the description and/or the operations of the embedded Artificial Neural Network P (221) is independent of the description (227) of the target Artificial Neural Network T (201).

The device R (232) can be an integrated circuit device (101) of FIG. 1, or a system illustrated in FIG. 5. The device R (232) has a deep learning accelerator (103) having at least one processing unit configured to perform matrix computations, such as a processing unit (111, 121, 141, or 161) illustrated in FIGS. 1-4. The device R (232) has a random access memory (105) coupled to the Deep Learning Accelerator (103) via a high bandwidth connection (119).

In general, there can be multiple ways to implement a same computation task in the runtime library (206) using the hardware capabilities of the device R (232). Different implementations can have different performance levels that are dependent on the performance levels of the hardware capabilities relative to each other and/or the pattern of data being processed by the runtime library (206) and/or the activities of the routines in the runtime library. In some instances, the device R (232) can offer hardware options that can be adjusted via the runtime library (206). Thus, there can be many decisions/selections to be made by the runtime library (206) to optimize the executions of the instructions (205) of the Artificial Neural Network T (201).

The selection of an execution option of the runtime library (206) can be dependent on the characteristics of the data being processed by the routines (222) during the execution of the instructions (205) of the Artificial Neural Network T (201). Further, selection of an execution option of the runtime library (206) can be dependent on the characteristics of the usage pattern of the routines in the runtime library (206) during the execution of the instructions (205) of the Artificial Neural Network T (201). The characteristics can be recognized by the embedded Artificial Neural Network P (221) of the runtime library (206) to generate an output to identify one or more execution options for the current or next run of the computation of the Artificial Neural Network T (201).

The data analyzed by the embedded Artificial Neural Network P (221) of the runtime library (206) is dependent on the input (211) to the Artificial Neural Network T (201) and the computation/states in the Artificial Neural Network T (201) during the processing of the input (211) and the generation of the output (213). Thus, the embedded Artificial Neural Network P (221) of the runtime library (206) can be seen as an add-on portion of the Artificial Neural Network T (201). The artificial neurons of the embedded Artificial Neural Network P (221) are implicitly connected to the artificial neurons of the target Artificial Neural Network T (201) via the connections between the instructions (205) of the target Artificial Neural Network T (201) and their usage of the routines (222) in the runtime library (206). The combination of the artificial neurons of the embedded Artificial Neural Network P (221) and of the target Artificial Neural Network T (201) can dynamically optimize its matrix computation in the compiler output (223) based on the input (211) to the Artificial Neural Network T (201).

The Artificial Neural Network P (221) of the runtime library (206) can be trained to identify optimized execution options to implement the computing tasks of the Artificial Neural Network T (201) using the hardware capabilities of the device R (232). After the training, when the instructions (205) in the compiler output (223) are executed by the Deep Learning Accelerator (103) in the device (232) and execution options of the routines (222) in the runtime library (206) are controlled by the embedded Artificial Neural Network P (221), the computing time to generate the output (213) from the Artificial Neural Network T (201) is reduced in comparison with alternative approaches.

Figure 7:
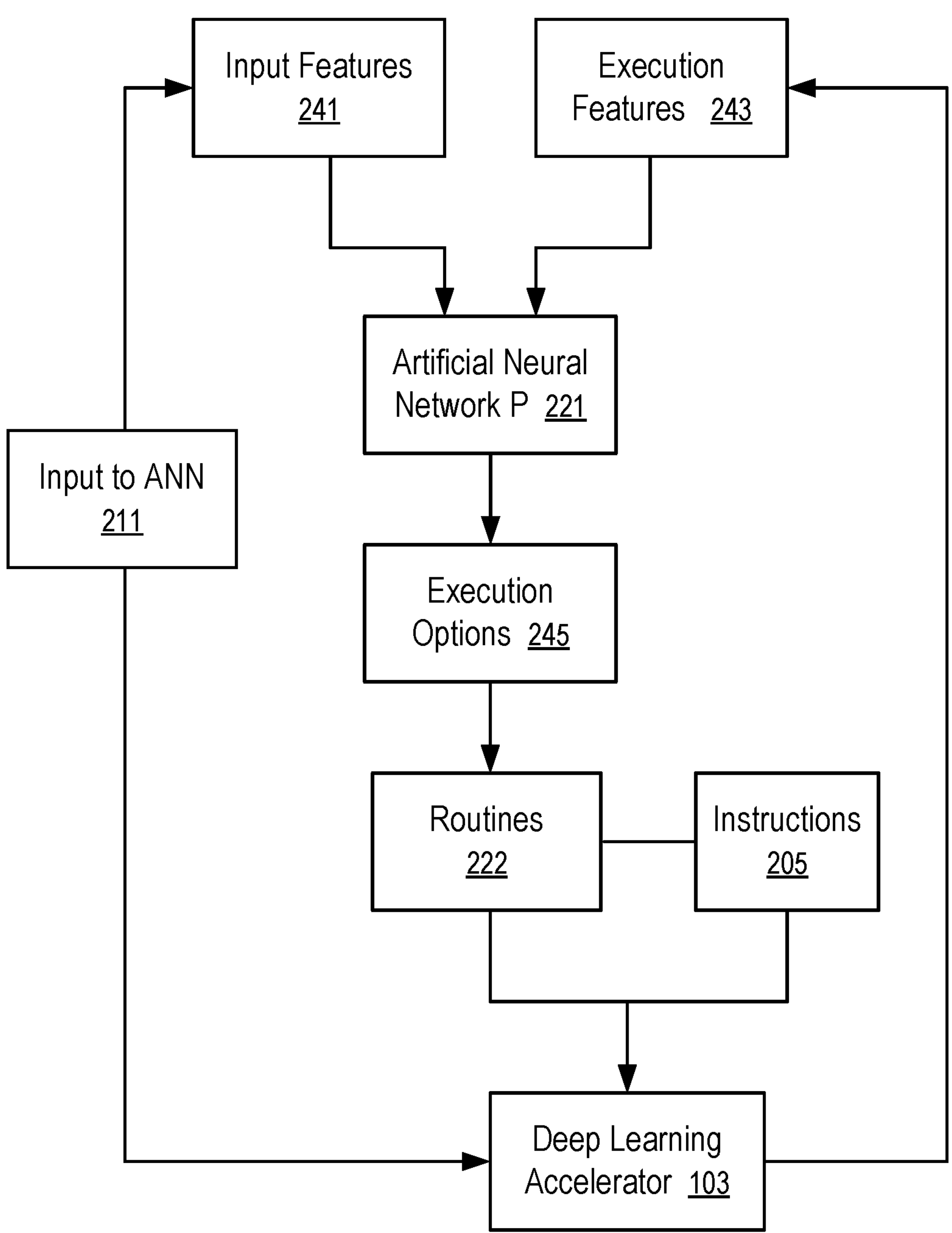
FIG. 7 illustrates a runtime library using an embedded Artificial Neural Network to control execution of instructions implementing the computation of an Artificial Neural Network according to one embodiment.

FIG. 7 illustrates a runtime library using an embedded Artificial Neural Network to control execution of instructions implementing the computation of an Artificial Neural Network according to one embodiment. For example, the technique of FIG. 7 can be implemented in the DLA compiler (203) illustrated in FIG. 5 and/or FIG. 6.

In FIG. 7, the instructions (205) generated to implement the computation of an Artificial Neural Network T (201) can cause the execution of routines (222) in a runtime library (206) of the DLA compiler (203). The execution of at least some of the routines in the runtime library (206) can cause the execution of the computation of the embedded Artificial Neural Network P (221) associated with the routines (222) and/or the runtime library (206).

The embedded Artificial Neural Network P (221) is configured to receive input features (241) and execution features (243) as an input to generate an output that contains execution options (245). The execution options (245) control the execution of the routines (222) in a Deep Learning Accelerator (103).

The input features (241) identifies characteristics of an input (211) to the Artificial Neural Network T (201) that is to be compiled by the DLA compiler (203) to generate the instructions (205) in the compiler output (223). For example, the input features (241) can include statistical data of matrices that are requested by the instructions (205) for processing using the routines (222) during the execution of the instructions of the Artificial Neural Network T (201). For example, the input features (241) can include patterns of data in the matrices processed by the routines (222) for the instructions (205) of the Artificial Neural Network T (201).

The execution features (243) identifies characteristics of the execution of the instructions (205) in the Deep Learning Accelerators (103). For example, the instructions (205) can include conditional branches that can alter the actual sequences of executed instructions (205) in the compiler output (223) based on the input (211) to the Artificial Neural Network T (201). The execution features (243) can include identifications of a pattern of instruction execution visible to the runtime library, such a pattern of the usage of the routines by the instructions (205).

Optically, the embedded Artificial Neural Network P (221) can further receive DLA features that identify hardware limitations, capabilities, and/or hardware options of the Deep Learning Accelerator (103).

The Artificial Neural Network P (221) is trained to generate/identify optimized execution options (245) based on the input features (241), the execution features (243), and/or other features associated with the execution of the instructions and/or the Deep Learning Accelerator (103).

The execution options (245) controls the usage of the routines (222) of the runtime library (206) to optimize the performance of the runtime library (206) in supporting the instructions (205) implementing the matrix computation of the Artificial Neural Network T (201).

The Artificial Neural Network P (221) can be implemented via instructions (e.g., compiled by the compiler (203) from a description of the Artificial Neural Network P (221)). The instructions of the Artificial Neural Network P (221) can be configured for execution by the Deep Learning Accelerator (103) in a way similar to the instructions (205) of the Artificial Neural Network T (201). Optionally, the Artificial Neural Network P (221) may optimize its use of the routines (222) in a way similar to the optimization of the usage of the routines (222) by the Artificial Neural Network T (201).

The compiler output (223) can be stored in the Random Access Memory (105) in the device R (232) such that when the device R (232) receives data representative of an input (211) to the Artificial Neural Network T (201), the Deep Learning Accelerator (103) of the device R (232) can execute the instructions (205) to generate a corresponding output of the Artificial Neural Network T (201).

Figure 8:
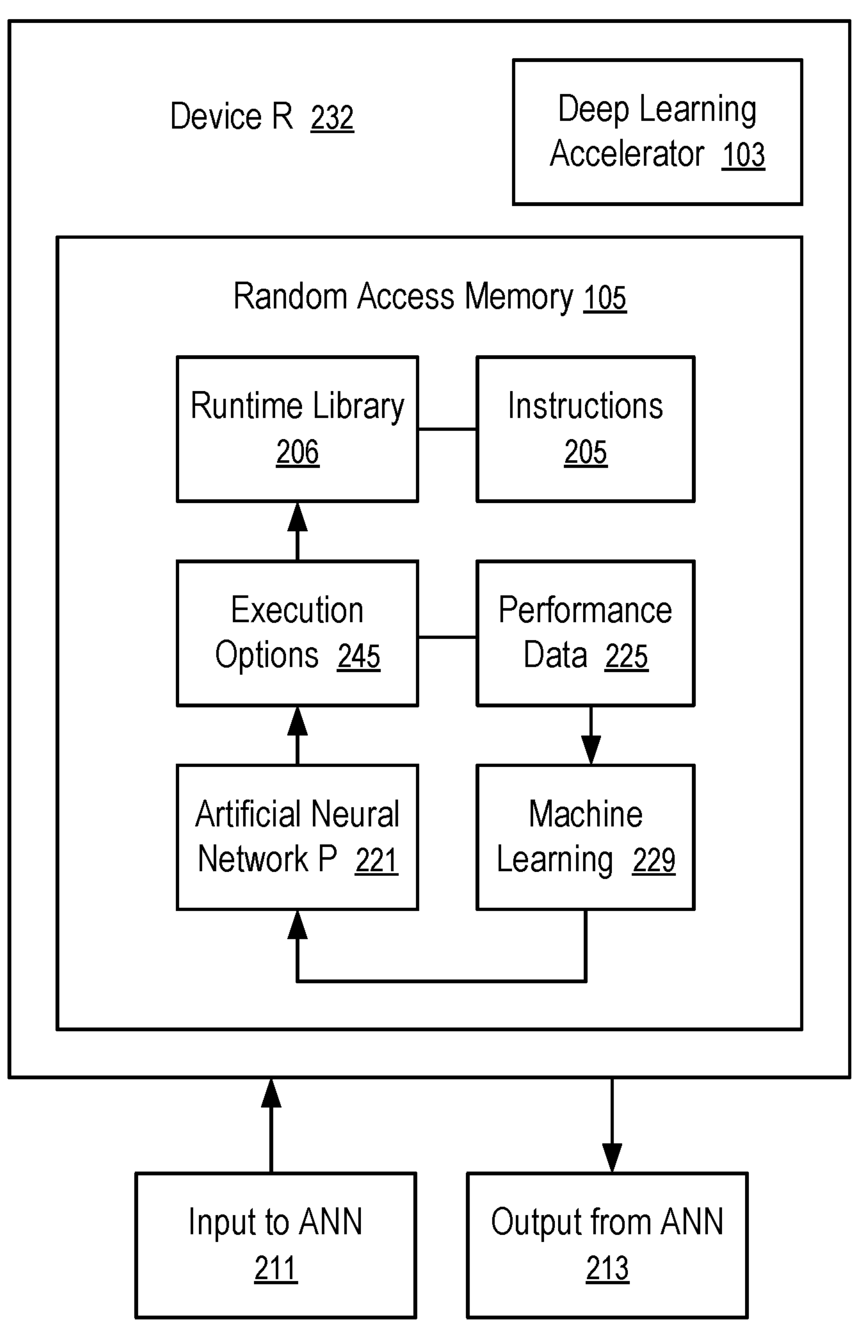
FIGS. 8 and 9 illustrate machine learning techniques to train an embedded Artificial Neural Network of a runtime library according to some embodiments.
Figure 9:
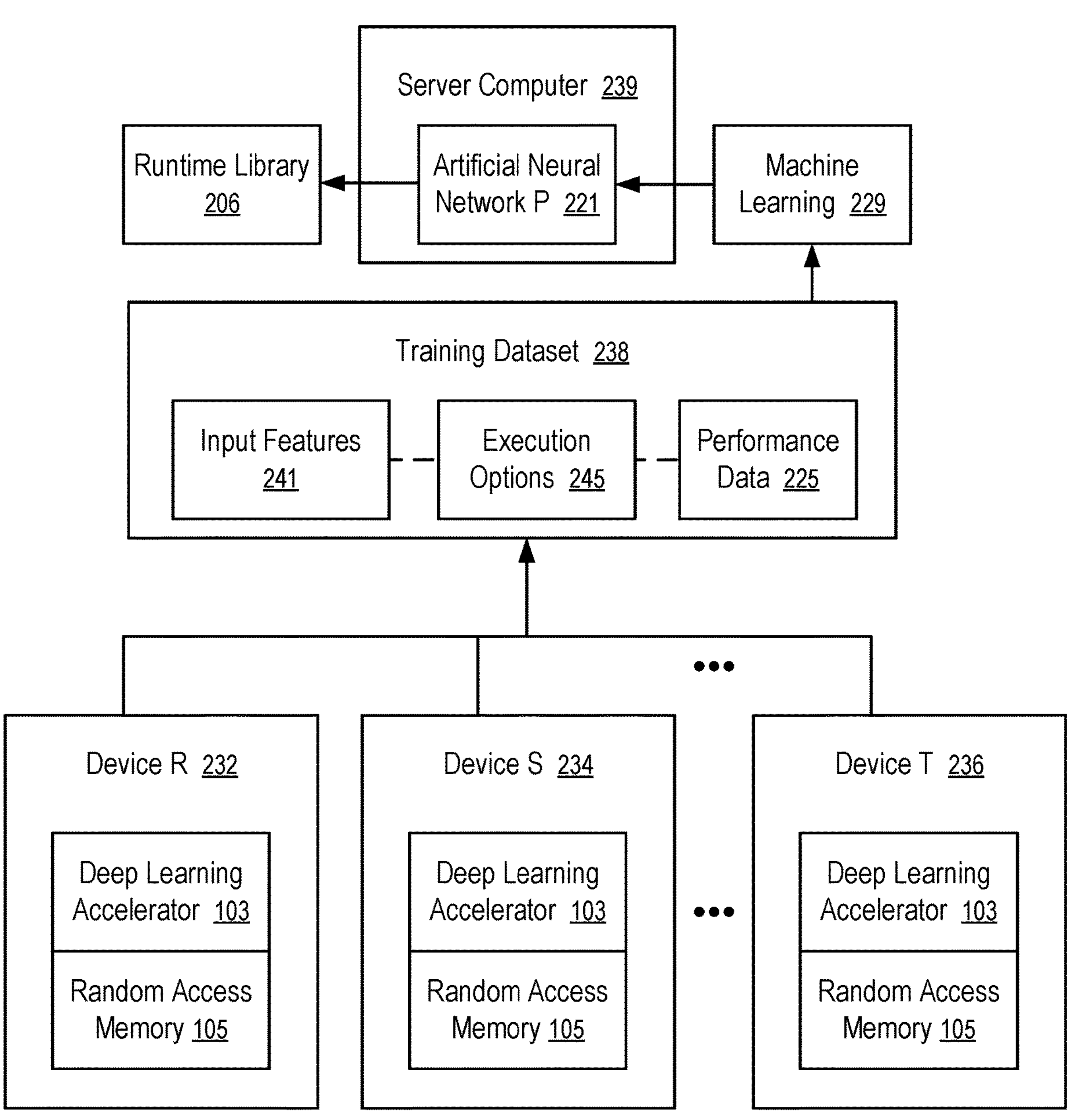

The embedded Artificial Neural Network P (221) can be trained through machine learning, as illustrated in FIGS. 8 and 9.

FIGS. 8 and 9 illustrate machine learning techniques to train an embedded Artificial Neural Network of a runtime library according to some embodiments. For example, the techniques of FIG. 8 and/or FIG. 9 can be used to train the embedded Artificial Neural Network P (221) of FIG. 6 and/or FIG. 7.

In FIG. 8, the embedded Artificial Neural Network P (221) can use different execution options (245) to control the use of the runtime library (206) during the execution of instructions (205) to perform the computation of the target Artificial Neural Network T (201). Performance data (225) of the executions controlled by respective execution options (245) is associated with features (e.g., 241 and/or 243) of the input (211) to the target Artificial Neural Network T (201). The Performance data (225) in association with the features and the execution options (245) can be used in machine learning (229) to train the embedded Artificial Neural Network P (221).

For example, during a training period, the device R (232) can receive different inputs (e.g., 211) to the target Artificial Neural Network T (201). In response, the device R (232) executes the instructions (205) to generate the corresponding outputs (e.g., 213). In processing the different inputs, the embedded Artificial Neural Network P (221) may initially randomly select execution options (245) to measure their performance data (225). The machine learning (229) can train the embedded Artificial Neural Network P (221) to generate improved execution options (245) for inputs (211) that are same, or similar in patterns. Thus, after a period of time, the performance of the Device R (232) in processing inputs (211) of various types of patterns can improve and become optimized.

The runtime library (206), the embedded Artificial Neural Network P (221), and/or the instructions (205) can include instructions to measure the performances of the device R (232) in executing the instructions (205) provided in the compiler output (223). For example, the instructions (205) can record the elapsed time of executing the compiler output (223) to generate the output (213) of the Artificial Neural Network (201). For example, the instructions (205) can record the elapsed time of executing a predetermined portion of the instructions (205) in the compiler output (223). For example, the elapsed time of the execution of various portions of the instructions (205) can be recorded as a performance measurement. The measurements can be included in the performance data (225) in association with the execution options (245) and the features (e.g., 241 and 243) associated with the inputs (211) to the target Artificial Neural Network (201).

Further, the DLA compiler (203) can generate different compiler outputs (223) to generate performance data (225) for different Artificial Neural Networks (e.g., 201). Thus, the machine learning (229) can train the Artificial Neural Network P (221) to predict optimized execution options (245) for a new Artificial Neural Network that has not yet been tried with different sets of execution options. Using the embedded Artificial Neural Network P (221) the device R (232) can optimize the use of the runtime library (206) for implementing a new Artificial Neural Network on the device R (232), or a similar device of the same platform, without having to try different sets of execution options.

FIG. 9 illustrates the use of a server computer (239) to train the embedded Artificial Neural Network P (221) of the runtime library (206) of a DLA compiler (203) to predict execution options.

In FIG. 9, multiple devices (232, 234, . . . , 236) are used to generate training dataset (238). Each of the devices (232, 234, . . . , 236) can generate a portion of the training dataset (238) in a way similar to the device R (232) illustrated in FIG. 8. The training dataset (238) includes execution options (245) used to control the usage of the runtime library (206), the performance data (225) of the respective executions controlled by the execution options (245), and the input features (241) of the inputs (e.g., 211) to one or more Artificial Neural Networks compiled and implemented in the devices (232, 234, . . . , 236). The training dataset (238) captures the relation among the input features (241), execution options (245) and the corresponding performance in processing the inputs having the features (241) via the execution options (245). The server computer (239) uses machine learning (229) to train the Artificial Neural Network P (221) for embedding in the runtime library (206) that can be further deployed to the devices (232, 234, . . . , 236) and/or other devices.

For example, a device S (234) can have instructions for implementing an Artificial Neural Network that is the same as, or similar to, the Artificial Neural Network implemented in the device R (232).

For example, a device T (236) can have instructions for implementing an Artificial Neural Network that is different from the Artificial Neural Network implemented in the device S (234).

Thus, the training dataset (238) can include performance data (225) associated with various patterns of the usage or the runtime library (206) in various scenarios. The broad coverage of the training dataset (238) can improve the applicability and performance of the embedded Artificial Neural Network P (221) of the runtime library (206).

In some implementations, the performance data (225) can be calculated from the timing parameters of executing various instructions in the devices (232, 234, . . . , 236). When the performance data (225) can be computed directly from the compiler outputs (223), it is not necessary to actually load the compiler outputs (223) into the devices (232, 234, . . . , 236) for execution and measure the performance data (225) from the execution. For example, the training dataset (238) can include performance data (225) generated from simulating the execution of the compiler outputs for various inputs (e.g., 211) and/or for various target Artificial Neural Networks (e.g., 201).

FIG. 10 shows a method of controlling execution of instructions by a Deep Learning Accelerator according to one embodiment. For example, the method of FIG. 10 can be used to generate DLA instructions (205) and DLA matrices (207) for the implementation of the matrix computations of an Artificial Neural Network (201) using a Deep Learning Accelerator (103) illustrated in FIGS. 1-4.

At block 301, a training dataset (238) is generated using a plurality of execution options (245) of a runtime library (206) in processing different data.

For example, the runtime library (206) can be installed in the one or more of the devices (232, 234, . . . , 236) illustrated in FIG. 9. When the runtime library (206) is used to process different data in respective devices (e.g., 232, 234, . . . , and/or 236), the input features (241) of the processed data are identified and associated with the execution options (245) used to process the respective data and the performance data (225) indicative of the performance levels of the execution options (245) for the respective input features (241).

For example, different available execution options can be random applied during a training period to the computations of one or more target artificial neural networks (e.g., 201) that are compiled to use the runtime library (206). The performance levels determined for randomly applied execution options allow the machine learning technique to determine and/or search for optimized random execution options.

In general, the training dataset (238) can be generated in one device (e.g., 232), or multiple devices (e.g., 232, 234, . . . , 236). The training dataset (238) can be generated for a same target artificial neural network (201) processing different inputs (e.g., 211) using different execution options (245), or for different target artificial neural network (201) processing different inputs (e.g., 211) using execution options (245).

At block 303, an embedded artificial neural network (221) is trained for the runtime library (206), using a machine learning technique (229) and the training dataset (238), to identify an optimized execution option as an output of the embedded artificial neural network (221).

For example, the training can be performed in a server computer (239) that is separate from the one or more devices (232, 234, . . . , 236) in which the training dataset (238) is generated. Alternatively, the training dataset (238) generated in a device (e.g., 232) can be used to locally train the embedded artificial neural network (221) installed in the random access memory (105) of the device (e.g., 232), as illustrated in FIG. 8.

The embedded artificial neural network (221) is configured to receive, as an input, data representative of features of data being processed by a target artificial neural network (e.g., 201) and to identify, as an output, one or more execution options to optimize execution of the runtime library (206) as used in the matrix computation of the target artificial neural network (e.g., 201).

However, the embedded artificial neural network (221) is constructed in a way that is independent of the description of the target artificial neural network (e.g., 201). Thus, the embedded artificial neural network (221) can be used with different target artificial neural network (e.g., 201). The embedded artificial neural network (221) accesses the data of the target artificial neural network (e.g., 201) via the use of the runtime library (206) by the target artificial neural network (e.g., 201). Thus, the data processed by the embedded artificial neural network (221) is derived from the input (211) to the target artificial neural network (201) and the execution of the instructions (205) to implement the computation of the target artificial neural network (201).

For example, the embedded artificial neural network (221) can be configured to recognize, during execution of the instructions of the target artificial neural network (e.g., 201), a pattern in data being processed by the routines (222)

in the runtime library (206) and identify the one or more execution options based on the pattern.

For example, the embedded artificial neural network (221) can be configured to recognize, during execution of the instructions of the target artificial neural network (e.g., 201), a pattern in usage of the routines (222) in the runtime library (206) and identify the one or more execution options based on the pattern.

At block 305, a computing apparatus running a compiler (203) receives data representative of a description (227) of an artificial neural network (201) to be compiled.

At block 307, the computing apparatus compiles the artificial neural network (201) specified by the description (227) based on the runtime library (206) executable on a device (e.g., 232, 234, . . . , or 236) and controllable via the embedded second artificial neural network (221).

At block 309, the computing apparatus converts the data representative of the description (227) into a compiler output (223) having instructions (205) executable on the device (e.g., 232, 234, . . . , or 236) to implement the artificial neural network (201). The instructions (205) are configured to call routines (222) in the runtime library (206) to perform predefined tasks and cause the embedded artificial neural network (221) to control execution of the runtime library (206) based at least in part on data being processed via the artificial neural network (201) specified by the description (227).

Figure 11:
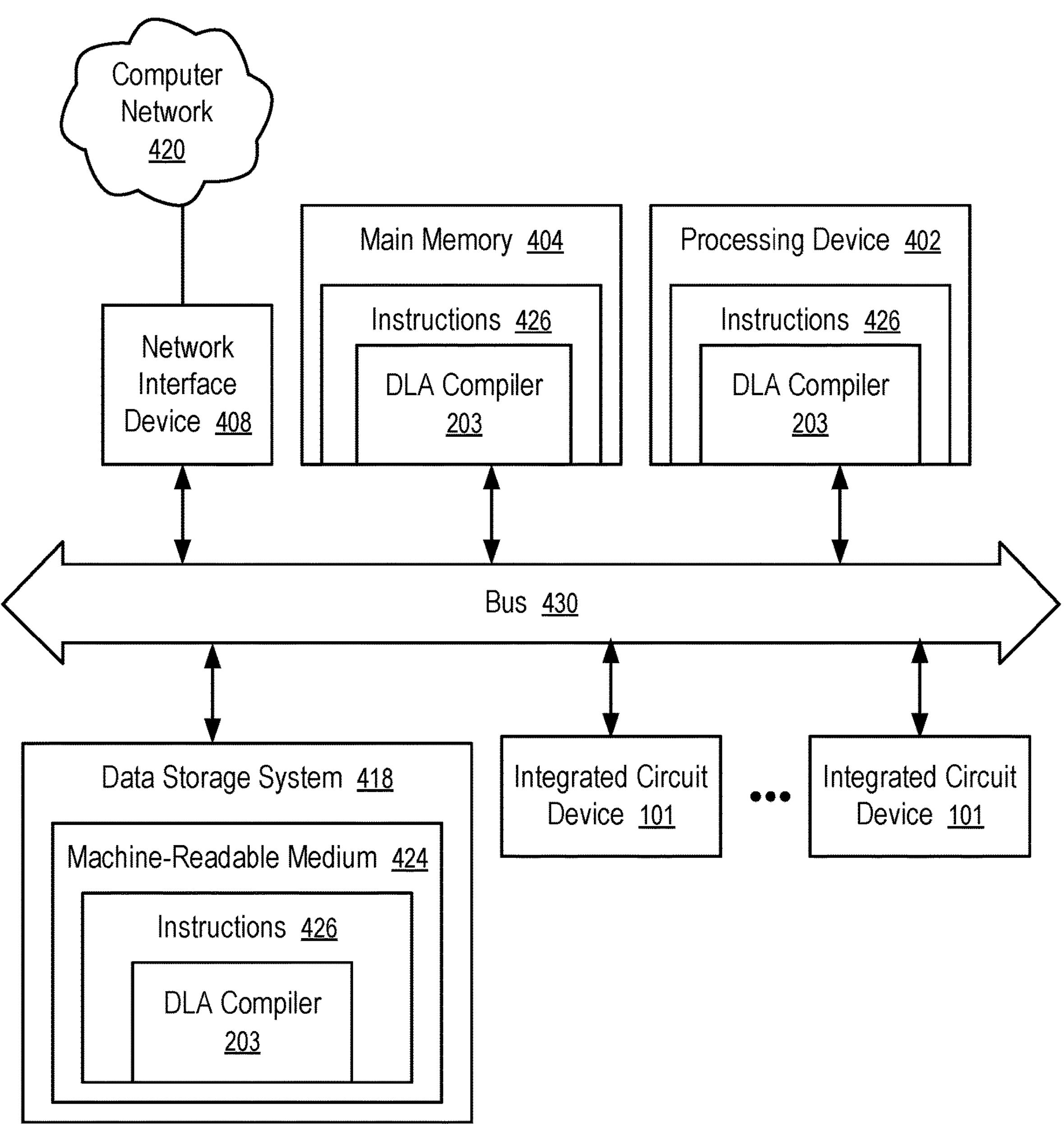
FIG. 11 shows a block diagram of an example computer system in which embodiments of the present disclosure can operate.

For example, the computing apparatus running the compiler (203) can be implemented using a machine illustrated in FIG. 11.

FIG. 11 illustrates an example machine of a computer system within which a set of instructions, for causing the machine to perform any one or more of the methodologies discussed herein, can be executed.

In some embodiments, the computer system of FIG. 11 can implement a system of FIG. 6 with integrated circuit devices (101) of FIG. 1 having matrix processing units illustrated in FIGS. 2-4. Each of the integrated circuit devices (101) can be used as a device (e.g., 232, 234, . . . , or 236) illustrated in FIGS. 6-9.

The computer system of FIG. 11 can be used to perform the operations of a DLA Compiler (203) described with reference to FIGS. 1-10 by executing instructions configured to perform the operations corresponding to the DLA Compiler (203).

In some embodiments, the machine can be connected (e.g., networked) to other machines in a Local Area Network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term “machine” shall also be taken to include any collection of machines that individually or jointly execute a set (or multiple sets) of instructions to perform any one or more of the methodologies discussed herein.

The example computer system illustrated in FIG. 11 includes a processing device (402), a main memory (404), and a data storage system (418), which communicate with each other via a bus (430). For example, the processing device (402) can include one or more microprocessors; the main memory can include read-only memory (ROM), flash memory, dynamic random access memory (DRAM), such as synchronous DRAM (SDRAM) or Rambus DRAM (RDRAM), static random access memory (SRAM), etc. The bus (430) can include, or be replaced with, multiple buses, multiple point to point serial connections, and/or a computer network.

The processing device (402) in FIG. 11 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device (402) can also be one or more special-purpose processing devices such as an application specific integrated circuit (ASIC), a field programmable gate array (FPGA), a digital signal processor (DSP), a network processor, or the like. The processing device (402) is configured to execute instructions (426) for performing the operations discussed in connection with the DLA compiler (203). Optionally, the processing device (402) can include a Deep Learning Accelerator (103).

The computer system of FIG. 11 can further include a network interface device (408) to communicate over a computer network (420).

Optionally, the bus (430) is connected to one or more integrated circuit devices (101) that each has a Deep Learning Accelerator (103) and Random Access Memory (105) illustrated in FIG. 1. The compiler (203) can write its compiler outputs (e.g., 223) into the Random Access Memory (105) of the integrated circuit devices (101) to enable the Integrated Circuit Devices (101) to perform matrix computations of an Artificial Neural Network (201) specified by the ANN description (227). Optionally, the compiler outputs (e.g., 223) can be stored into the Random Access Memory (105) of one or more other integrated circuit devices (101) through the network interface device (408) and the computer network (420).

The data storage system (418) can include a machine-readable medium (424) (also known as a computer-readable medium) on which is stored one or more sets of instructions (426) or software embodying any one or more of the methodologies or functions described herein. The instructions (426) can also reside, completely or at least partially, within the main memory (404) and/or within the processing device (402) during execution thereof by the computer system, the main memory (404) and the processing device (402) also constituting machine-readable storage media.

In one embodiment, the instructions (426) include instructions to implement functionality corresponding to a DLA Compiler (203), such as the DLA Compiler (203) described with reference to FIGS. 5-10. While the machine-readable medium (424) is shown in an example embodiment to be a single medium, the term “machine-readable storage medium” should be taken to include a single medium or multiple media that store the one or more sets of instructions. The term “machine-readable storage medium” shall also be taken to include any medium that is capable of storing or encoding a set of instructions for execution by the machine and that cause the machine to perform any one or more of the methodologies of the present disclosure. The term “machine-readable storage medium” shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an interconnect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media (e.g., non-transitory computer storage medium) such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising: predicting, for a first artificial neural network and by utilizing a second artificial neural network embedded in a runtime library and constructed independent of a description of the first artificial neural network, at least one execution option of execution options based on a pattern of data being processed by the first artificial neural network, wherein the at least one execution option comprises a hardware option optimized for processing the pattern of data; compiling, by a computing apparatus, the first artificial neural network based on the runtime library executable on a device and controllable via the second artificial neural network; and converting, by the computing apparatus, data representative of the description of the first artificial neural network, into a compiler output having instructions executable on the device to generate an output of the first artificial neural network by selecting from the execution options for routines during execution of the instructions, the instructions configured to call the routines in the runtime library to cause the second artificial neural network to control execution of the runtime library based at least in part on the data being processed by the first artificial neural network, wherein at least one of the routines is implemented based on the at least one execution option predicted, wherein the routines in the runtime library are not specific to the first artificial neural network, wherein the second artificial neural network is configured to receive data representative of features of the data being processed by the first artificial neural network and to identify, as an output, the execution options to optimize execution of the runtime library; and wherein the runtime library and/or the instructions measure performance of executing the compiler output on the device by recording an elapsed time of executing the compiler output and recording an elapsed time of executing a predetermined portion of the instructions on the device, and store performance data comprising the recorded elapsed times, the performance data being associated with the at least one execution option and with features of an input to the first artificial neural network, and use the performance data in machine learning to train the second artificial neural network to identify an execution option for subsequently processed inputs.

2. The method of claim 1, wherein the second artificial neural network is configured to receive, as an input, data representative of features of data being processed by the first artificial neural network and to identify, as an output, the execution options to optimize execution of the runtime library.

3. The method of claim 2, wherein the second artificial neural network is constructed independent of the description of the first artificial neural network.

4. The method of claim 3, wherein the second artificial neural network is configured to recognize, during execution of the instructions, the pattern of data being processed by the routines in the runtime library.

5. The method of claim 3, wherein the second artificial neural network is configured to recognize, during execution of the instructions, a pattern in usage of the routines in the runtime library and identify the execution options based on the pattern.

6. The method of claim 3, wherein computation of the second artificial neural network is connected to computation of the first artificial neural network through usage of the routines of the runtime library during execution of the instructions converted from the description of the first artificial neural network; and data processed by the second artificial neural network is derived from an input to the first artificial neural network and execution of the instructions.

7. The method of claim 6, wherein the device has random access memory and at least one processing unit configured to perform matrix operations; the compiler output includes first data representative of parameters of the first artificial neural network and second data representative of the instructions executable by the at least one processing unit to generate the output of the first artificial neural network responsive to the input to the first artificial neural network; and computation of the second artificial neural network is implemented via execution of further instructions by the at least one processing unit.

8. The method of claim 3, further comprising: generating a training dataset using a plurality of the execution options; and training the second artificial neural network, using a machine learning technique and the training dataset, to identify an execution option as an output of the second artificial neural network based on data processed by the runtime library.

9. The method of claim 8, wherein the generating of the training dataset comprises: applying the plurality of the execution options during different runs of the compiler output in processing different inputs to the first artificial neural network; and determining performance levels of the execution options in association with features of the different inputs to the first artificial neural network.

10. The method of claim 9, wherein the training of the second artificial neural network is performed in the device.

11. The method of claim 9, further comprising: receiving training datasets generated by a plurality of devices having the runtime library; and updating the runtime library to include instructions and matrices configured to implement the second artificial neural network trained using the training datasets.

12. A computing apparatus, comprising: memory; and at least one microprocessor configured to: predict, for a first artificial neural network and by utilizing a second artificial neural network embedded in a runtime library and constructed independent of a description of the first artificial neural network, at least one execution option of execution options based on a pattern of data being processed by the first artificial neural network, wherein the at least one execution option comprises a hardware option optimized for processing the pattern of data; compile the first artificial neural network based on the runtime library executable on a device and controllable via the second artificial neural network; and convert data representative of a description of the first artificial neural network into a compiler output having instructions executable on the device to generate an output of the first artificial neural network, the instructions configured to call routines in the runtime library to cause the second artificial neural network to control execution of the runtime library based at least in part on the data being processed by the first artificial neural network by selecting from the execution options for the routines during execution of the instructions, wherein at least one of the routines is implemented based on the at least one execution option predicted, wherein the routines in the runtime library are not specific to the first artificial neural network, wherein the second artificial neural network is configured to receive data representative of features of the data being processed by the first artificial neural network and to identify, as an output, the execution options to optimize execution of the runtime library; and wherein the runtime library and/or the instructions measure performance of executing the compiler output on the device by recording an elapsed time of executing the compiler output and recording an elapsed time of executing a predetermined portion of the instructions on the device, and store performance data comprising the recorded elapsed times, the performance data being associated with the at least one execution option and with features of an input to the first artificial neural network, and the at least one microprocessor is further configured to use the performance data in machine learning to train the second artificial neural network to identify an execution option for subsequently processed inputs.

13. The computing apparatus of claim 12, wherein the second artificial neural network is configured to receive, as an input, data representative of features of the first artificial neural network and data representative of features of the device to identify the compilation output and to identify, as an output, the compilation output.

14. The computing apparatus of claim 13, wherein the features of the first artificial neural network identify a pattern of neuron connectivity in the first artificial neural network; and the features of the device identify a pattern of performance levels of capabilities of the device in performing matrix operations.

15. The computing apparatus of claim 14, wherein the at least one microprocessor is further configured to: generate a training dataset using a plurality of different compilation options; and train the second artificial neural network, using a machine learning technique and the training dataset, to identify a compilation option as an output of the second artificial neural network based on data processed by the runtime library.

16. The computing apparatus of claim 14, wherein the training dataset includes performance indicators of a plurality of different compiler outputs generated using the plurality of different compilation options.

17. The computing apparatus of claim 14, wherein the device comprises an integrated circuit die of a Field-Programmable Gate Array (FPGA) or Application Specific Integrated Circuit (ASIC) implementing a Deep Learning Accelerator, the Deep Learning Accelerator comprising at least one processing unit configured to perform matrix operations and a control unit configured to load instructions from random access memory for execution.

18. The computing apparatus of claim 17, wherein the at least one processing unit includes a matrix-matrix unit configured to operate on two matrix operands of an instruction; wherein the matrix-matrix unit includes a plurality of matrix-vector units configured to operate in parallel; wherein each of the plurality of matrix-vector units includes a plurality of vector-vector units configured to operate in parallel; and wherein each of the plurality of vector-vector units includes a plurality of multiply-accumulate units configured to operate in parallel.

19. A non-transitory computer storage medium storing instructions which when executed by a computing apparatus cause the computing apparatus to perform operations comprising: predicting, for a first artificial neural network and by utilizing a second artificial neural network embedded in a runtime library and constructed independent of a description of the first artificial neural network, at least one execution option of execution options based on a pattern of data being processed by the first artificial neural network, wherein the at least one execution option comprises a hardware option optimized for processing the pattern of data; compiling the first artificial neural network based on the runtime library executable on a device and controllable via the second artificial neural network; and generating, by the computing apparatus from data representative of the description of the first artificial neural network, a compiler output having instructions executable to generate an output of the first artificial neural network, wherein at least one routine of a plurality of routines called in the runtime library to cause the second artificial neural network to control execution of the runtime library is implemented based on the at least one execution option predicted, wherein the routines in the runtime library are not specific to the first artificial neural network by selecting from the execution options for the routines during execution of the instructions, wherein the second artificial neural network is configured to receive data representative of features of the data being processed by the first artificial neural network and to identify, as an output, the execution options to optimize execution of the runtime library; and wherein the runtime library and/or the instructions measure performance of executing the compiler output on the device by recording an elapsed time of executing the compiler output and recording an elapsed time of executing a predetermined portion of the instructions on the device, and store performance data comprising the recorded elapsed times, the performance data being associated with the at least one execution option and with features of an input to the first artificial neural network, and use the performance data in machine learning to train the second artificial neural network to identify an execution option for subsequently processed inputs.

20. The non-transitory computer storage medium of claim 19, wherein the method further comprises: generating a training dataset using a plurality of compilation options; and training the second artificial neural network, using a machine learning technique and the training dataset, to identify a compilation option as an output of the second artificial neural network based on data processed by the runtime library.

* * * * *